(12) United States Patent
Majumdar

(10) Patent No.: US 10,747,740 B2
(45) Date of Patent: Aug. 18, 2020

(54) COGNITIVE MEMORY GRAPH INDEXING, STORAGE AND RETRIEVAL

(71) Applicant: KYNDI, INC., San Mateo, CA (US)

(72) Inventor: Arun Majumdar, San Mateo, CA (US)

(73) Assignee: KYNDI, INC., Redwood City, CA (US)

( * ) Notice: Subject to any disclaimer, the term of this patent is extended or adjusted under 35 U.S.C. 154(b) by 480 days.

(21) Appl. No.: 15/568,293

(22) PCT Filed: Mar. 24, 2016

(86) PCT No.: PCT/US2016/024060
§ 371 (c)(1),
(2) Date: Oct. 20, 2017

(87) PCT Pub. No.: WO2016/154460
PCT Pub. Date: Sep. 29, 2016

(65) Prior Publication Data
US 2018/0137155 A1 May 17, 2018

Related U.S. Application Data

(60) Provisional application No. 62/137,598, filed on Mar. 24, 2015.

(51) Int. Cl.
*G06F 17/10* (2006.01)
*G06F 16/22* (2019.01)
(Continued)

(52) U.S. Cl.
CPC .......... *G06F 16/2228* (2019.01); *G06F 16/28* (2019.01); *G06F 16/9024* (2019.01); *G06N 10/00* (2019.01)

(58) Field of Classification Search
None
See application file for complete search history.

(56) References Cited

U.S. PATENT DOCUMENTS 8,539,359 B2 * 9/2013 Rapaport ............... G06Q 10/10
715/751
8,631,038 B2 * 1/2014 Mellmer ................. G06F 21/31
707/783
(Continued)

FOREIGN PATENT DOCUMENTS

JP 2013-156960 A 8/2013

OTHER PUBLICATIONS

International Search Report dated Jun. 16, 2016, in PCT/US2016/024060 filed Mar. 24, 2016.
(Continued)

*Primary Examiner* — Rehana Perveen
*Assistant Examiner* — Cuong V Luu
(74) *Attorney, Agent, or Firm* — Oblon, McClelland, Maier & Neustadt, L.L.P.

(57) ABSTRACT

The present disclosure provides a fast approximate as well as exact hierarchical network storage and retrieval system and method for encoding and indexing graphs or networks as well as for identifying substructure matches or analogs within graph data. Cognitive Memory encodes graphs via generalized combinatorial maps and a new quantum-inspired Q-Hashing algorithm to summarize local structures of the graph along with a contraction and graph property calculation to build an index data structure called the Cognitive Signature for property based, analog based or structure or sub-structure based search. The system and method of the present invention is ideally suited to store and index all or parts or substructures or analogs of graphs as well as dynamically changing graphs such as traffic graphs or flows and motion picture sequences of graphs. The system and method has the advantage that properties of the Cognitive Signature of the graph can be used in correlations to the
(Continued)

properties of the underlying data making the system ideal for semantic indexing of massive scale graph data sets.

20 Claims, 22 Drawing Sheets

(51) Int. Cl.
    *G06N 10/00*     (2019.01)
    *G06F 16/28*     (2019.01)
    *G06F 16/901*     (2019.01)

(56) References Cited

U.S. PATENT DOCUMENTS

| | | | |
|---|---|---|---|
| 8,819,078 B2 | 8/2014 | Roy et al. | |
| 9,158,847 B1* | 10/2015 | Majumdar | G06F 16/951 |
| 9,467,492 B2* | 10/2016 | Mosko | H04L 65/60 |
| 2005/0262179 A1 | 11/2005 | Tucci | |
| 2007/0239694 A1 | 10/2007 | Singh et al. | |
| 2007/0271381 A1 | 11/2007 | Wholey et al. | |
| 2008/0183853 A1* | 7/2008 | Manion | H04L 67/104 |
| | | | 709/223 |
| 2014/0366051 A1* | 12/2014 | Cronk | H04N 21/23109 |
| | | | 725/14 |
| 2015/0033106 A1 | 1/2015 | Stetson et al. | |
| 2016/0055542 A1* | 2/2016 | Hui | G06Q 30/0269 |
| | | | 705/14.66 |
| 2016/0125467 A1* | 5/2016 | Scott | G06Q 30/0261 |
| | | | 705/14.58 |
| 2019/0294629 A1* | 9/2019 | Wexler | G06F 16/50 |

OTHER PUBLICATIONS

Daras, "Research Directions and Foundations in Topological Quantum computation Methods", Journal of Applied Mathematice & Bioinformatics. vol. 3, No. 4, (2013), pp. 1-90, ISSN: 1792-6602 (print), 1792-6939 (online).

European Search Report dated Jul. 26, 2018 in European Patent Application No. 16 769 711.9-1871 with English Translation.

Office Action dated Jan. 18, 2019 in Japanese Patent Application No. 2017-549621, 13 pages (with English translation).

Korean Office Action dated May 24, 2019 in Patent Application No. 10-2017-7026949, 7 pages (with English translation).

Communication pursuant to Article 94(3) EPC dated Feb. 7, 2020 in European Patent Application No. 16 769 711.9. 5 pages.

Canadian Office Action dated Dec. 13, 2019 in Canadian Patent Application No. 2,979,066, 6 pages.

Japanese Office Action dated Dec. 13, 2019 in Japanese Patent Application No. 2017-549621 (with English translation), 14 pages.

Office Action dated Apr. 8, 2020 in Chinese Application No. 201680017897.6 with English translation, 7 pages.

* cited by examiner

|  | v1 | v2 | v3 | v4 |
|---|---|---|---|---|
| v1 | 0 | 0 | 1 | 0 |
| v2 | 0 | 0 | 1 | 1 |
| v3 | 1 | 1 | 0 | 1 |
| v4 | 1 | 1 | 1 | 0 |

ADJACENCY MATRIX

FIG. 9

|    | v1 | v2 | v3 | v4 |
|----|----|----|----|----|
| v1 | 3  | 0  | 1  | 1  |
| v2 | 0  | 9  | 1  | 1  |
| v3 | 1  | 1  | 5  | 1  |
| v4 | 1  | 1  | 1  | 7  |

MATRIX FOR ENCODING A COLORED NETWORK

*FIG. 10*

NODE FUNCTION WEIGHING MATRIX

|   | 1 | 2 | 3 | 4 |
|---|---|---|---|---|
| 1 | 0 | 0 | $\frac{1}{\sqrt{3*5}}$ | $\frac{1}{\sqrt{3*7}}$ |
| 2 | 0 | 0 | $\frac{1}{\sqrt{9*5}}$ | $\frac{1}{\sqrt{9*7}}$ |
| 3 | $\frac{1}{\sqrt{3*5}}$ | $\frac{1}{\sqrt{9*5}}$ | 0 | $\frac{1}{\sqrt{5*7}}$ |
| 4 | 0 | $\frac{1}{\sqrt{7*9}}$ | $\frac{1}{\sqrt{7*5}}$ | 0 |

FIG. 11

$$F = 2 * \left( \frac{1}{\sqrt{3*5}} + \frac{1}{\sqrt{3*7}} + \frac{1}{\sqrt{9*5}} + \frac{1}{\sqrt{9*7}} \right) = 1.5029522723057779$$

MATRIX PROPERTY FUNCTIONS

FIG. 12

|    | er | es | et | rs | rt | st |
|----|----|----|----|----|----|----|
| er | 0  | 0  | 0  | 0  | 0  | 1  |
| es | 0  | 0  | 1  | 0  | 0  | 0  |
| et | 0  | 0  | 0  | 1  | 0  | 0  |
| rs | 0  | 0  | 0  | 0  | 0  | 0  |
| rt | 0  | 0  | 0  | 0  | 0  | 0  |
| st | 0  | 1  | 0  | 0  | 0  | 0  |

COMBINATORIAL PATH-GRAPH MATRIX

*FIG. 13*

1 — NETWORK

2 — CONNECTIVITY MATRIX

```
    a b c d e f g m n o p q r
a   0 1 0 0 0 0 0 0 0 0 0 0 0
b   1 0 1 1 0 0 0 0 0 0 0 0 0
c   0 1 0 0 0 0 0 1 0 0 0 0 0
d   0 1 0 0 1 1 0 0 0 0 0 0 0
e   0 0 0 1 0 0 0 0 0 0 0 0 0
f   0 0 0 1 0 0 0 0 0 0 0 0 0
g   0 0 0 0 0 0 0 1 0 0 0 0 1
m   0 0 1 0 0 0 1 0 1 0 0 0 0
n   0 0 0 0 0 0 0 1 0 1 0 0 0
o   0 0 0 0 0 0 0 0 1 0 1 0 0
p   0 0 0 0 0 0 0 0 0 1 0 1 0
q   0 0 0 0 0 0 0 0 0 0 1 0 1
r   0 0 0 0 0 0 1 0 0 0 0 1 0
```

3 — DISCRETE CODE (TAKING THE UPPER TRIANGULAR ELEMENTS ONLY STARTING FROM THE DIAGONAL) = (100000000000,11000000000,0000100000,110000000,00100001,0010000,001000,00100, 0010,010,01,0)=
(13,1000000000000110000000000000100000110000000001000010010000001000,0010000100100010)=
(13,86220663345438418546689)

4 — THE FACTORADIC CODE FOR 86220663345438418546689 IS:

[3, 7, 15, 12, 8, 11, 15, 7, 6, 13, 0, 4, 5, 2, 6, 6, 1, 1, 1, 0, 1, 1, 1, 0]

A QUICK SANITY CHECK SHOWS THAT:

86220663345438418546689/23! = 3.335161980448153

5 — DISCRETE UNCOLORED NETWORK REPRESENTATION CODE = DUNRC

= [13, [3, 7, 15, 12, 8, 11, 15, 7, 6, 13, 0, 4, 5, 2, 6, 6, 1, 1, 1, 0, 1, 1, 1, 0]]

COGNITIVE MEMORY GRAPH INDEXING, STORAGE AND RETRIEVAL

CROSS-REFERENCE TO RELATED APPLICATIONS

This application is based upon and claims the benefit of priority to provisional U.S. Application No. 62/137,598, filed Mar. 24, 2015, the entire contents of which are incorporated herein by reference.

BACKGROUND

Field of the Disclosure

The present disclosure describes a "Cognitive Memory" model that enables encoding and decoding of networks, and their substructures of any size for rapid storage, query processing and retrieval. The model specifically couples the concepts of a localized, oriented subspace, based on a partition algorithm called Q-Medoids, with a local description of the sub-graphs using a quantum-inspired hashing scheme, called Q-Hashing, within a larger graph and a global space of the graph by mapping the graph to a generalized map.

The generalized map uses a new representation of where nodes and edges take on real and complex values. Such a representation inverts the traditional concept where a quantum random walker embeds the notion of the complex vector space and instead the graph itself is defining the complex space. The model maintains a global description of the larger graph as well as its contained sub-graphs that are both uniquely utilized in a rewriting process. The rewriting process involves building a local and global representation that guarantees a fixed termination point of the method to produce a multi-index structure for answering queries such as, whether a given query graph exactly or approximately matches a stored graph or is the given graph a part of one of the stored graphs. Moreover, the rewriting process can also provide insight as to whether a part of a graph is "in-between" other parts of other graphs i.e. a feature of in-betweeness and reachability can be achieved.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Networks (also variously referred to as graphs) storage methods have been based on variations of hashing and content-based access, as in image databases, chemical molecular databases, social, financial, traffic networks and Internet network content databases. The world's most popular algorithm for network based indexing is the Google™ Page-Rank algorithm that operates on networks derived from Internet in-and-out links to hub pages of content. Hierarchical sub structures in complex networks are ubiquitous in biomic, proeteomic, genomic, neural and social organizations. The identification of related network groups (RNGs) within complex networks is generally harder than the simple graph-isomorphism or sub-isomorphism problem because it involves partitioning a network into hierarchical subnetwork groups of nodes that can be linked or associated in a diversity of different ways due to the structure, functionality and evolution of the whole network and its constructive constituents. For example, community detection uses the concept of betweeness and modularity to achieve a division algorithm that removes progressively the links with largest betweeness until the network breaks up into components: whether smaller clusters can be refined inside a modular component is hard if the network is one with a self-similar or iterative, recursive, nature (e.g. scale-free network). A hierarchical representation and partition strategy is needed that clusters the different structure levels while not discarding links at any stage of the process, since every link potentially contains information about the structures in the network.

Topological or geometric metrics on networks, such as Hosoya's Topological Index and Google's Page-Rank respectively, when used alone and even in combination are not sufficient to describe the content description of images, especially in terms of variances over time, and nor as a tool to express complex, relational, analogy-like queries where brittle matching between networks is undesired. In image processing, for example, graphs provide a good expression of content, but graph based storage and retrieval is hard as the scale, sizes, resolution, number and fidelity of images, either singly, or in sequence as in videos, increases, and this drives up the complexity of graph based methods.

In Internet search, Google's™ Page-Rank has been the dominant and most successful network indexing algorithm. However, Page-Rank fails to capture the analogies between web-sites, as well as context or even to serve as a means to profile web-site users by content representation. In algorithms such as Page Rank and other graph algorithms, the main focus is on connected-components and identifying important semantic concepts by the so-called hubs representing the maximally connected components that capture the most import underlying concepts.

The majority of other graph based algorithms and their main clustering methods all build on a single, static view of the largest connected components of the graphs or networks formed from the incoming data: whether the data is text (i.e. forming Text Graphs) or images (i.e. segmenting and forming image graphs for visual pattern recognition) or financial networks or molecular or biochemical graphs and networks (for drug design or chemical property assessments).

For retrieving candidate graphs, currently there are two main approaches in the literature:

Index based approaches such as Levinson's Universal Graph [3], SUBDUE and others [4]; and, Vector based approaches such as Attribute Relational Graph "ARG" methods by Petrakis [5].

Methods (i) and (ii) fail when structural variability, complexity, diversity and features are widely differing, or when there is a lot of dynamical changes to graphs. None of the methods is well suited to encoding and storing sequences of dynamical changes to the graphs.

Index based approaches maintain static, often pre-computed set, of hierarchical indexes of member graphs, which is traversed in response to a query. During the traversal, a distance metric via the index values between the query graph and the current index element is calculated and used for retrieval. Vector based approaches consider member graphs as a vector of features, and transform each graph onto a feature space. Usually, vectorization is performed on attributes of the graph. In this process, the structural properties that show how graph attributes that are inter-linked get neglected.

Network retrieval in image databases is different from graph retrieval in chemical data banks and is very different from retrieval in text databases or hyperlinked webs since the semantics are completely different. Some application areas require graph databases perform best when there are similar structures but variations on a theme (such as CAD drawings or other mechanical catalog parts) using a universal graph concept in which every graph is a variation of the universal graph stored in the database. This means that the member graphs are mostly similar with respect to structure. But the number of possible node and edge attributes for each graph would be large. In fact, every modern OORDBMS (Object Oriented Relational Database Management System) can be considered to be an attribute relational graph database. This is because, a relational schema has an equivalent ER (Entity Relation) schema graph and hence be considered to be a graph database where member graphs are different instances of its ER schema graph. However, query processing and creation of a high complexity structure-oriented graph storage system has little in common with OORDBMS systems and hence there are no systems commonly available to store and retrieve networks at massive scales because in most cases, the graphs do not share near-identical structures but may be locally different though globally similar (e.g. as in protein structures) or locally similar but globally very different (e.g. as in graphs of texts in linguistic resources).

Accordingly, there is a requirement for a method that accommodates these widely different perspectives. Specifically, there is a requirement for a framework that enables capturing, in an efficient manner, dynamic changes in graphs.

SUMMARY

Cognitive Memory is suited for relational querying of graphs, analog discovery, data mining and graph-structure-content to semantic property correlations. Data with graph-structure includes social networks, biochemical networks, protein and chemical molecular graphs, dynamical time varying graphs such as traffic network graphs and financial transaction networks as well as communication systems topologies. The problem of indexing, storage, recall and comparison of graphs to each other is the fundamental problem addressed by the present disclosure.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

The following figures describe the present invention:

FIG. 9 depicts according to an embodiment, an exemplary connectivity matrix;

FIG. 10 illustrates an exemplary colored connectivity matrix;

FIG. 11 depicts a Node Function Weighted Matrix;

FIG. 12 illustrates Matrix Property Function as Sum of Reciprocal Square Roots of Adjacent Node Weights;

FIG. 13 depicts a Combinatorial Path Graph Matrix of the Letter Pairs in the word "tester"

DETAILED DESCRIPTION

Figure 1:
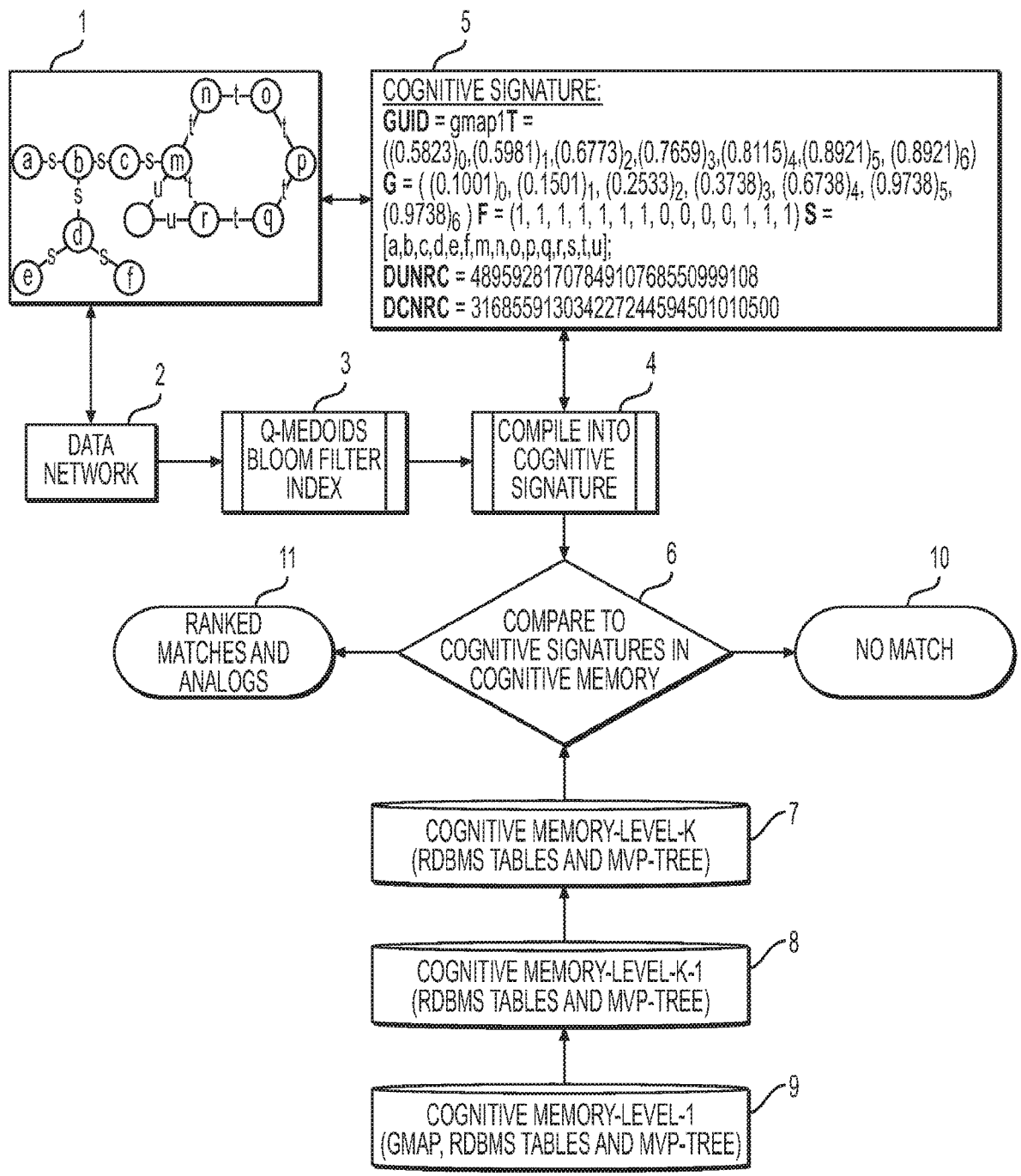
FIG. 1 illustrates a Cognitive Memory System and Process.

Cognitive Memory is a new and greatly enhanced representation, method and algorithm for learning graph data and associating the structure of the graph with measures that are representative of observations of interest. See U.S. Pat. No. 9,158,847, incorporated herein by reference in its entirety. For example, the changes in the structures of the finance networks over time or the variations of traffic or transportation networks over time may be addressed by utilizing the Cognitive Memory model approach. Various graph kernels have become an efficient and widely-used method for measuring similarity between graphs, but these methods are not scalable past many millions or billions of nodes or data flows of the whole gigantic complex network. These huge graphs occur commonly in domains, such as natural language processing, as text graphs, chemoinformatics, as molecular structures and bioinformatics as proteome or biome networks, image analysis, such as medical image understanding, computer vision, such as cognitive scene understanding and the like. Furthermore, for many of the graph structures, it is the continuous-valued observable or measurable aspects such as data flow density, velocity, shape, object relational positions or other measured node or edge or combined properties that determine the critical and key features for classification, categorization and semantic understanding of these graph structures.

The Cognitive Memory model described herein presents a unique and inventive combination of coupling the process of folding, or contracting, a graph as well as, optionally reversibly or losslessly, expanding or unfolding the transformed graph structure along with complex-vector valued locales (i.e. subspaces) on graphs with optionally discrete or continuous-valued node or edge or node and edge attributes.

In traditional state of the art wave-propagation methods, a random or quantum like walk is conducted on a graph whose structure remains static. This includes, for example, the Weisfeiler-Lehman algorithm, Graph Invariant Kernels and Wave (as well as so-called Quantum Wave) Propagation Kernels: the graph kernel captures the structural features of the paths and these can be used for comparison between graphs. However, all of these methods, without exception, have very high exponential power (e.g. $n^4$) complexity in the numbers of nodes and edges as well as, or, in the size (diameter) of the input graphs: therefore, they are impractical for graphs with tens or hundreds of thousands or millions or more nodes and edges.

A much less obvious set of issues are also addressed by aspects of the present disclosure to which the literature on graph kernel and graph structure learning does not provide obvious or direct solutions:
(i) Graph data at various levels of granularity often originates in some form of ordering: for example, if the characters in a text are represented by graphs, then the letters of the words in the text represent one level or granularity ordering above the characters, and the total graph of the text of the words represents another. The state of the art in representing these orderings, as well as evolution and structuring of graphs for the purpose of indexing, storage, recall and reasoning of, potentially ordered graph sequences is no more than various ad-hoc handcrafted approaches tailored to highly specific applications.
(ii) Graph or network data domains, as noted, have significantly diversified applications and as a result, include a widely varying set of features (e.g. characters, texts, images, traffic, social networks, etc.). The state of the art today is to select and craft the features manually in a way that is highly specific to a particular application. The end result is that none of the manual approaches are generalizable nor transferable nor re-usable;
(iii) Graph data is often large, with temporal changes in, and between, the network structures that may easily exceed hundreds, thousands, or millions of edge and node differences. In complex systems, where there can be multiple networks for each observation or datum, such sizes become astronomically large and the result is that computation time to identify similarities, analogs or isomorphism's becomes impractical, even on super computers.

Aspects of the present disclosure address the above stated issues, so that graph data indexing, storage, recall, processing for reasoning of important features are performed in a highly efficient and novel fashion. Moreover, there exists a uniquely strong coupling between feature abstraction, structural rewriting of graphs, and signatures over dynamical kernels that do not depend on static structures as in the case of traditional approaches. Additionally, the system can handle varying graphs over time or as graphs that vary with events in which each datum can be representative of a set or collection or sequentially partially ordered, or fully ordered graph itself.

Human ad-hoc or handcrafted approaches are no longer required because the graph is described by a collection of canonical features based on a collection of functions and graph contraction operations (that can be reversible). Such a collection of canonical features, including their development over time, is represented in a Cognitive Signature. The Cognitive Signature is composed of a sequence of vectors that enables sequences and structures of different sizes and lengths to be metrically comparable. The methodology presented herein, according to a preferred embodiment, directly eliminates the necessity of manual feature selection and extraction.

Cognitive Signatures use a complex valued vector space in which nodes and edges correspond, roughly, to rotations (movements) of a subspace, where higher order moments can also be taken, but whose composition yields a non-commutative kernel that captures order or sequence structure. Therefore, the Cognitive Memory model enables straightforward machine learning of arbitrarily complicated sequences of graph-structured data for which no non-sequential kernels complex valued kernel methods are presently known to exist. Consequently, the Cognitive Memory model and its signature forms a human-like pattern based graph indexing, storage, recall and reasoning system for not only representing structural graphs but episodic sequences or episodic memory of complicated ordered structures. The Cognitive Signature can be very efficiently computed and its properties are ideally suited to ultra high-speed low-rank accelerated approximated computation if a fast in-cache computation is needed. These include popular methods singular value decomposition based methods, Markov, Gaussian or Dirichlet process method learning, and approximation methods therein without limitation to Cholesky approximations, Nyström approximations, similar matrix techniques.

Moreover, by certain aspects of the present disclosure, one can use complex valued kernels for potential field functions to determine a geometric shape for vertices as an embedding (within a GMAP), and that the process produces what we define here as the Q-Medoids in the GMAP using its darts (which represent the original graph vertices or edges). An iterative random process, similarly to classical Gaussian process methods, which are analogous to the quantum random walk process, is used to model locales of the graph (i.e. the medoids). It must be appreciated that one of the many features of the present disclosure that is non-obvious is the creation of the subspace representing the medoids via a (quantum or classical) random-walk, and that the process is conceptually inverted so that instead of a particle walking the graph, it is in fact the graph nodes or edges walk themselves according to a potential field function that repels or attracts adjacent vertices (dually, edges) resulting in either a rearrangement or a contraction in shaping the subspace.

The quantum random walk operates on a state space spanned by vectors, and, therefore, following the previous analogy of inverting the conceptualization, the vectors are assembled by functions that compute the properties of the graph after each transition of the function on the vertices.

General approaches to machine learning over time series data falls into five thematic areas:
1. Neural networks (so-called "Deep Learning") based machine learning;
2. Symbolic learning based on logical and dynamical programming (such as methods using logic programming languages like Prolog and various sequence subsequence comparison methods based on strings);
3. Kernel learning in the machine learning community for graphs and other complex data (such as imagery);
4. Random or stochastic evolutionary methods, such as genetic algorithms; and,
5. Manifold methods and locally linear subspace approximations such as rough paths, graph spectral, manifold learning.

However, only recently has Quantum inspired algorithms emerged along with other "physics-inspired" approaches that use tensors, tensor-networks, and complex vector valued functions. The Cognitive Memory model falls in the emerging final category of methods. Hence, the kernel, in analogy to molecular orbital theory, is inspired by the linear combination of atom orbitals (LCAO) and the molecular electro-static pseudo-potential methods to eliminate the combinatorial complexities in analogy to other general polynomial representations of complex combinations of polynomial systems.

According to an aspect of the present disclosure, the encoding of the network is encapsulated in a data-structure called the "Cognitive Signature" (CS) and is a signature based method that can be decoded to reproduce the input network. The database used to store all the Cognitive Signatures to form what is referred to herein as the Cognitive Memory (CM) and can be implemented on any relational database management system (RDBMS) that supports a spatial data representation that can store arbitrary (including complex) vectors using, for example, Multi-Vantage Point Trees. The method and schema for storage or query processing using Cognitive Memory is presented to provide fast analogical results or exact results to user queries. The framework of network encoding described herein provides an (n)log(n) complexity for recall. Uniquely, the framework enables topic and concept extraction as a natural part of the encoding process by association between the highest k-order complex in the generalized combinatorial map (GMAP) representation of a graph and the most important underlying semantic properties of the data being encoded.

The main idea of Cognitive Memory is to combine an iterative contraction process with a function computed on the graphs that is derived from a canonical method to partition out locales of a larger graph into representative sub-maps. The process will contract the graphs (i.e. sub-maps) and compute a locality based index for the sub-maps: the method assumes that the local sub-maps are chosen by process of randomly distributing seeds and then defining a range (radius) for a ball containing the neighborhood of vertices.

The Cognitive Memory makes use of a special and short hash structure that is small enough, compact, and fast to compute. The hash can be used as indices into gigantic graphs (millions, billions or trillions of nodes). The hash incorporates the concepts of graph distances with respect to vertices and shells to enable fast approximate graph distances. The innovation draws from the ideas of partitioning the large dynamic graphs into collections of over-lapping index regions inspired by the ideas in network structure index NSI Algorithm. However, the key differences between the NSI and the framework of the present disclosure are that the NSI is not incorporated into a hash and that the definition and computation of the NSI and its use do not incorporate locality sensitive indexing or the complex vector values.

The system and method of Cognitive Memory makes use of a quantum physics inspired method that eliminates the factorial network description space to represent the graph structure by representing the connectivity matrix in terms of potential fields or wave functions of the nodes and links. Specifically, all n nodes are projected as points (vertices) over a one (n-1) dimensional polytope and allowed to move as point-like objects while the edges are complex valued that generate forces acting on these nodes representing oriented, neutral, attractive or repulsive states for nodes that are proximate (i.e. virtual link), connected or disconnected in order pet with a computation of a function of the graph and then its subsequent contraction to (n-2) until a fixed point of (n-(n-1)) is reached. It must be appreciated that the real-valued node and complex valued edge can be dually also seen as complex valued node and real valued edges if the convention is chosen one way or the other.

The introduction of complex valued functions for the edges gives the vertices the opportunity to cluster correctly due to the interactions of their potential field functions with the edge-wave functions and these clusters may be subsequently contracted: without the use of the complex numbers, vertices and edges with only real values under the influence of the function would have the tendency to move towards each other and merge, collapsing rapidly to a single point that would represent the whole network. As an example, taking the derivative of a complex potential function that represents the dynamics of the node produces a velocity flow field in complex conjugate form which can be used to identify the directions of motion of the nodes. Such a model was introduced by Gudkov et. al [11, 12, 13] but improves on it because the Gudkov model is based solely on a simplistic real potential well and not on the complex potential functions and did not incorporate the method of the Q-Medoids or the method of the Q-Hash of the present disclosure.

An aspect of the present disclosure provisions for the use of a contraction-operation that is reversible but that forces the collapse of the graph into hierarchies that help the uniqueness of the solution. Such a contraction is guaranteed by the choice of the wave functions, the potential field function forces that depend on the relative distances between vertices. The algorithm considers the motion of vertices as a quantized directional motion of virtual quantum particles in a field with a non-dimensional number coefficient that can be machine-learned using a simple simulated annealing process (analogous with quantum annealing) that is proportional to the field density (in analogy with the Reynolds Number which relates to concepts such as fluid flow and viscosity).

Furthermore, the Cognitive Memory model relies on hierarchical Bloom Filters to perform rapid tests to build candidates from the spaces of graphs that are constructed by the method of the present disclosure in order to produce an extremely fast and rapid solution for large graph databases.

An aspect of the present disclosure provides the following advantageous ability in contrast to Google's Page-Rank algorithm. A feature of the present disclosure, via the use of the Contraction Rule, automatically identifies the largest k-dimensional complex within the combinatorial map, therefore, capturing the most important underlying concepts and thus suitable for use as an alternative algorithm to Google's Page-Rank for similar operations.

Furthermore, in comparison, and unlike Page-Rank, that cannot be effectively used for identifying homologs and analogs of structures, especially to relate their changes over time, the present disclosure enables fast and easy identification of core conceptual structure and changes in the structure by combining a measurement rule (i.e. a function to produce a value based on the structure and geometry of the generalized map representing the data) and a maximal contiguously contracted generalized map with the maximal most important primitive concepts are projected as the maximal topological cellular complex of highest dimensionality.

Additionally, the present disclosure produces a sequence of successively abstracted hierarchical representations that produces a set of matrix of signatures that identifies graphs by their dynamic evolution under a semantically based Contraction Rule. The result is that networks and their data are encoded in a way that is both content and structure sensitive, and in which the highest dimensionality of the k-cells formed under the Contract Rule, represents the important concepts or features for indexing or clustering, at various levels of abstraction. These abstractions enable fast analog and homolog identification.

Therefore, a key benefit of the present invention is that of being able to efficiently account for the dynamical changes between similar graphs based on the variance in the signatures that are directly derived from the topological changes in their sub-networks (i.e. sub-graphs).

Furthermore, the present disclosure incurs the advantageous ability that as the sizes of graphs and network structures become larger, the present disclosure scales and supports bigger data with only minimal incremental changes and without any re-indexing of the core data stores. Larger or different graphs and network structures are simply appended into the current store without re-indexing.

The techniques described in the present disclosure also incur the following advantages:
  (a) Using a query graph, to retrieve a set of matching candidate graphs from a specially encoded global representation called the Cognitive Signature;
  (b) Matching a query graph to candidates and selecting matching subpart the local Q-Medoids Bloom Filter in each of the candidates retrieved from a database of Cognitive Signatures, called the Cognitive Memory;
  (c) Computing and correlating properties of encoded by the graphs with the properties of the underlying data that has been encoded by the graphs (for example, image properties when graphs encode pictures, or chemical properties when graphs encode chemical structures or other semantic properties of the underlying data).
  (d) Storing sequential dynamical changes to the graphs in an efficient manner using a code expression tree representation; and,
  (e) Correlating the changes in the graph structure as the graph's underlying data changes with semantic properties of interest.

Embodiments of the present disclosure provide a system and method to encode, decode, store and retrieval networks by their structure or semantic properties. The graph is transformed into a generalized combinatorial map (GMAP). The GMAP provides three significant advantages for representation and for encoding algorithms: First, for a graph, the GMAP provides a natural dual representation where each vertex of the GMAP belongs to an implicit object called a dart, and, as will be shown, this can also represent a corresponding edge in the original graph. Secondly, functions, not necessarily the involutions, used to build the GMAP from the graph, but others such as a function that traverses the darts of the GMAP is representative of the state space of the traversal of the edges, and dually, of the vertices, of the original graph. Therefore, the GMAP is a succinct and elegant representation of graphs that makes it easy to define algorithms whose behavior as functions are covariant to features or properties of interest within the original graph. Thirdly, the GMAP is designed to accommodate embeddings, i.e., the present disclosure extends the concept of embedding Q-Medoids that enable fast localized processing to index the fine grained substructures e submaps). As stated, the graph, or network structure, is encoded into generalized combinatorial maps (GMAPS), these GMAPS are partitioned into sub-maps using a Q-Medoids graph algorithm defined herein (not to be confused with the K-Medoids algorithms in the literature); codes are computed on the GMAP using matrix Factoradic numbering; and, Lehmer Codes as well as matrix property functions, all tightly coupled (i.e. paired) with a Contraction Rule, to produce a set of signatures aggregated into a data structure called a Cognitive Signature. The Cognitive Signature includes, firstly, a topological encoding, called the Discrete Uncolored Network Representation Code (DUNRC); secondly, a geometric encoding (that accounts for network content) called a Discrete Colored Network Representation Code (DCNRC); thirdly, a k-vector of k-matrix property valuation functions that projects the network into a vector space; fourthly, an m-vector of m-matrix topology valuation functions that projects the network into another vector space; and, fifthly, a Network Contraction Tree Code (NCTC) with a newly derived Q-Mediod Complex Bloom Filter Index (CBFI) representation of the network that greatly extends the indexing power of other previous methods.

The preprocessing time complexity is linearly proportional to the input graph size but storage and recall time is sub-linear and proportional as log(n) of the size of the graph. It is well established that graph comparison is a NP-Complete problem. This means that the runtime complexity of most such algorithms is $O(e^{(N+E)})$ where N is the number of nodes and E is the number of edges in the graph. The encoding framework of the present disclosure is able to perform significantly better by splitting the process into two phases: a compilation phase of both input query graphs and other graphs, and a query phase. In the compilation phase, the graph is transformed into a GMAP and partitioned according to the Q-Medoid algorithm, Complex Filters are inserted and spectral values of the network are computed across contractions for all networks to be queried using geometric and topology property functions of the matrix representing the network. The network matrix property functions are chosen such that they are those computable in $O(N+E)$ runtime in the preferred embodiment. During the compilation, the Q-Medoids and Bloom filters are precomputed only once, and then the networks are contracted in $O(\log(N+E))$ contraction steps per input. The total compilation time is $O((N+E)*\log(N+E))$ for each network. To handle K networks, the total time becomes $O(K*(N+E)*\log(N+E))$, which is much faster than traditional methods at $O(K*e^{(N+E)})$. At query time, computations are performed on only new input query graphs since those in the database are in compiled form, that is, in the form of Cognitive Signatures. Thus, the query time for networks is relatively small, $O(\log(K))$, where K is the number of networks in the database.

The foregoing paragraphs have been provided by way of general introduction, and are not intended to limit the scope of the following claims. The described embodiments, together with further advantages, will be best understood by reference to the following detailed description taken in conjunction with the accompanying drawings.

Referring now to the drawings, wherein like reference numerals designate identical or corresponding parts throughout the several views.

FIG. 1 illustrates the system and encoding for Cognitive Memory encoding networks for fast semantic indexing, storage and retrieval. The system is and method is described by the following numbered elements referring to FIG. 1:

A network (1), called the Data Network (2) to be processed is present to the system
  The Data Network (2) is compiled (4) by a process (3) into a Cognitive Signature (5), comprises a GUID (Global Unique Identity Designation) name called "gmap1" in this case (but is different and unique for each network) matrix T (also called Topology), of vectors, one for each level, K, for which the input Network (1) has been contracted and a matrix of vectors, G (also called Geometry) on for each level K for which the input Network (1) has been contracted, the symbols, S, of the content or labels of the Network (1), a DUNRC (Discrete Uncolored Network Representation Code) for topology with a DCNRC (Discrete Colored Network Representation Code) for geometry, representing the input network (1) and intermediate codes for each level of contraction; and, The Cognitive Signature (5) is compared at each level K of the set of databases that each store the discrete values in tables, one table for each level of contraction, indexed by a primary key, the DUNRC values, the secondary key as the DCNRC, and third key being the GUID and Level of contraction and a pair of Multi-Vantage Point Trees (or other equivalent spatial data structure) that stores the vectors of T and G respectively along with the GUID and Level of contraction shown in (6), (7) and (8). The database at level (8) is the database that stores the original input Network as a Generalized Combinatorial Map (GMAP).

If the input Network (1) is not matched based on comparing its Cognitive Signature (5) stored in the databases, Cognitive Memories (6), (7), (8) wherein there are K-databases, one for each Contraction Level, then, no match is returned (9) and the input s stored in the Cognitive Memory using the system and methods detailed in the present disclosure; else, For any exact, analogous or partial matches (of sub-networks), then, these are returned in a ranked order (10) by ranking the T and G and vectors of the networks returned at the Level returned. Therefore, a multiple levels of detail are returned, though in the preferred use case, the user may filter out unwanted level of details.

Figure 2:
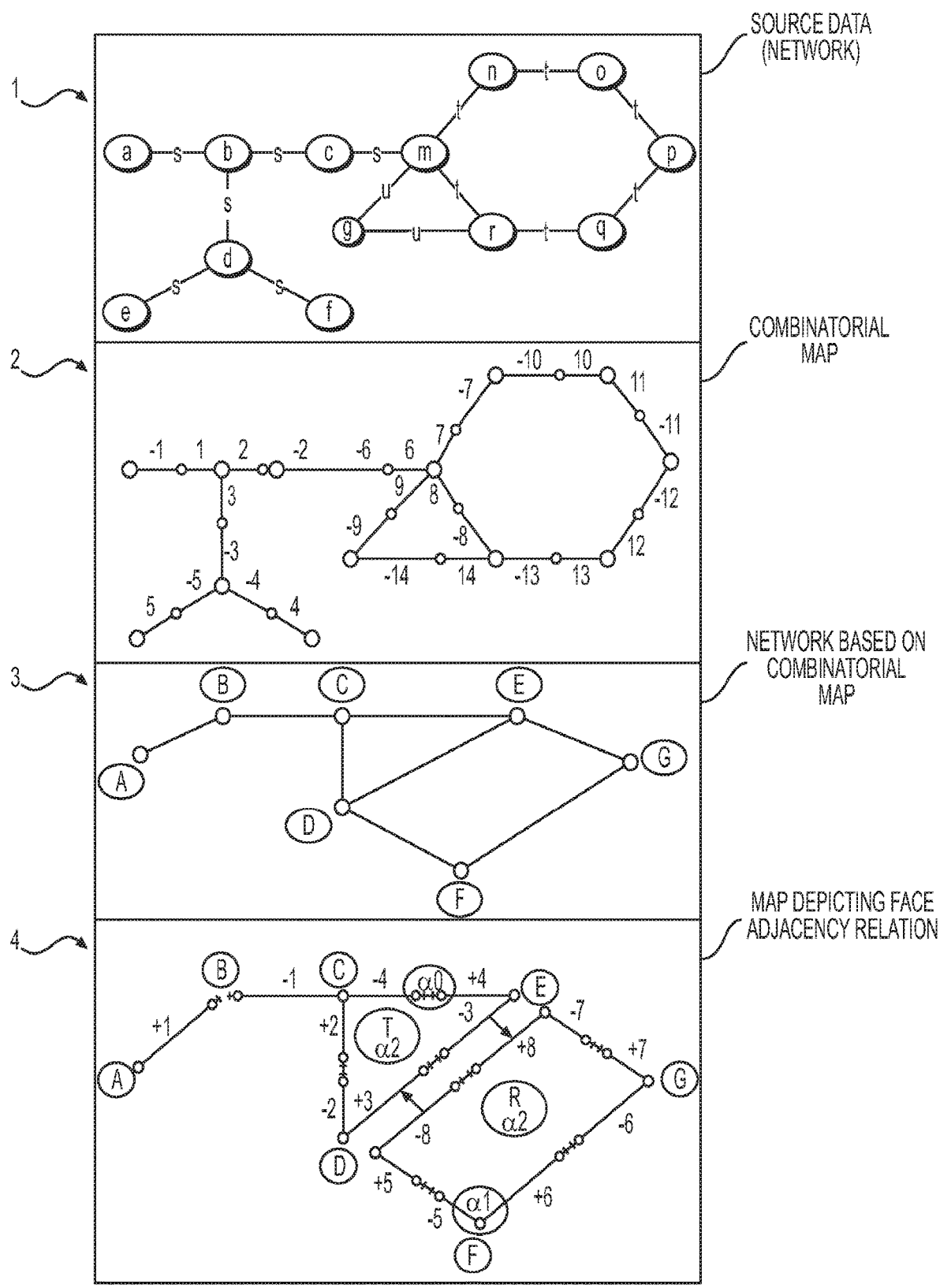
FIG. 2 illustrates encoding a Network as a Generalized Combinatorial Map.

FIG. 2 illustrates the form of the generalized combinatorial maps (GMAPS) for graph structures. In what follows is initially provided a description of Bloom filters according to on embodiment of the present disclosure.

When building the structural locale, a bloom filter is used as an index constrained by two thresholds: MaxR and NumOrbits. MaxR is the maximum radius of the neighborhood of dart D. To accommodate the lower bound of a range, the neighborhood is partitioned into a set of orbits. The parameter NumOrbit controls the number of orbits in the neighborhood. An orbit is constrained to the metric range [minR, maxR], which means that darts whose shortest distance to D is within the interval are associated with the orbit. For example, if MaxR=1000, and NumOrbit=10, then the orbits are [1, 100], [101, 200], . . . , [901, 1000].

The construction depends on using the constraints MaxR and NumOrbits around a dart whose embedded geometry is representative of the locale as a k-simplex, in other words, a local coordinate systems of barycentric coordinate systems representing points as the linear combination of polytope vertices. The variant of the bloom filter used in this patent is based on using a pairing-function to compose the real and imaginary parts of the complex number (barycentric coordinates) representing the orbits of the adjacent darts vertices at edge lengths away from the central chosen root vertex). The simplest paring function can be used, such as Cantor's pairing-function, $\pi(a,b)$, to pair the two numbers into the m-bit Bloom Filter:

$$\pi(a,b)=\frac{1}{2}\cdot(a+b)(a+b+1)+b$$

Other pairing functions can be used, the main point being that the complex number coefficients are mapped into a natural number which represents the bits in a bucket of the bloom filter.

An edge query in multiple GMAPS (and complementarily, in graphs) is defined using the global DCNRC to select a candidate graphs from which the locale bloom filter based index is used to identify a submap (i.e. subgraph) of an input query graph to a candidate graph returned from the database.

Given an edge implicitly defined by an involution between darts (d1, d2) between in a GMAP, G1, and bounded in the interval between [15, 25], and darts (e1, e2) in another GMAP, G2, then if the bloom filter for G1 has a bucket associated with orbits from [10, 20] and from [20, 30] that cover the interval [10, 30] which includes the interval [15, 25], then the bloom filter data structure can be used to check the buckets of by testing in G1 and testing in G2 noting that there is no false negative in the bloom filter. However, there could be false positives. To those skilled in the art, the size of the bloom filter can be set to the acceptable value (for example, 10 bits for 1% false positives or more if a lower false positive rate is needed). In any case, candidates can be directly checked quickly.

FIG. 2 illustrates the relationship between a network and it's encoding into a Generalized Combinatorial Map (GMAP). The original source data network (1) and the combinatorial map derived from the network (2) are illustrated in FIG. 2. A network, also called a graph (1), in which the there is an explicit encoding of the orientation of edges around a given vertex, and in which the edges are composed of two half-edges, called darts, each dart having its origin at the vertex it is attached to, is equivalent to a GMAP, (2). The fact that two half-edges as defined by their darts determine the same edge is recorded in a permutation function called an involution such that the successor of the first dart in the edge is the second dart and that the successor of the second dart is the first. Oriented edges require four darts: two to specify the edge, and two to specify the relative orientation or direction of the edge; and, orientation for a fully oriented network can be accomplished using simply a convention about the direction of the signs of the integers representing the darts although this is not possible when a network has partially oriented and partially undirected parts, then four darts are required, per Liu 1999 [1]. When the darts are not incident by their half-edges, but may be originating from the same place (i.e. node), then they are 1-adjacent at the same place, and are hence defined around the node by a second permutation operation called an orbit, which is a successor permutation that defines the (local) arrangement of darts around a node and the operation is commonly called an $\alpha 1$-involution. When two darts are at two different places to each other, and their half-edges, which 0-dimensional objects, are adjacent, the two zero-dimensional incidences produce a 1-dimensional line and the involution is commonly called $\alpha 0$-involution: the simplest involution is multiplication by negative one (−1) so that application twice results in the original number. Each orbit of a successive sequence of darts is associated to one node and encodes the sequence of darts encountered when turning counterclockwise around this node. (e.g. the orbit (6, 7, 8) in FIG. 1, (2)). Face adjacency and volume or hyper-volume adjacency permutations are commonly defined and understood for generalized combinatorial maps for those skilled in the art. Referring to FIG. 2 (3) and FIG. 2 (4), for example, the network (3) is represented using the combinatorial map (4) where there are face adjacency relations, "T" and "R" and involution types marked as $\alpha 0$, $\alpha 1$ an $\alpha 2$ respectively for edges, vertices and faces based having 0-dimensional adjacency, 1-dimensional-adjacency or 2-dimensional adjacency respectively. The present disclosure does not detail the methods for manipulating GMAPS in great details since all of these methods are a standard part of the literature and methods in the references of Liu [1] and Kropatsch [7]. Also, and of note, is that the edge in FIG. 1 (3), labeled (D), (E), is expressed by a pair of a pair of darts. When two pairs of darts represent the same shared edge, they defined different k-complexes labeled, so that the darts numbered as (3,−3) belong to "T" and the darts labeled as (8,−8) belong to "R": in this case the two pairs of darts are 1-sewn together. To separate them, the operation is called unsewing. By k-sewing the darts of sub-maps of combinatorial maps, objects in the map can be combined together. The operation of combining objects using darts is generally called Contraction.

As has been made clear in the foregoing, Generalized Combinatorial Maps (GMAPS) are a topological and combinatorial data structure that are based on the concept of encoding permutations of relative adjacency relationships between primitive elements called darts. The present invention uses two kinds of darts: a half-edge dart and an empty dart. Empty darts are used to define partial combinatorial maps or partial structures in which the algorithms depend on incident pairs of objects being either unsewn to convert cycles into trees or, vice-versa, to add darts to convert trees into cycles, or also, that empty darts can fill in the "blanks" to complete the structures for the purpose of the algorithms of the present invention. Between darts, there is an adjacency relationship that is defined by dimensionality, with the empty dart having no defined dimensionality (i.e. not zero but undefined and the empty dart is marked specially whenever it is needed, which, usually, is very rarely). A single half-edge dart has a dimension of zero, and it is convenient to refer to the dimensionality as a k-dimensional cell separate and distinct from the object, of dimension N, that the dart may be a part of: therefore, k=dim(c) denotes the dimension of the cell c and N denotes the dimension of the object. Therefore, a 0-cell is a vertex, a 1-cell is an edge, a 2-cell is a polygon, a 3-cell is a polyhedron and so forth. Darts are either sewn together, or unsewn when separated, and, in the case of adjacent faces, the "shared" edges are separated such that each face has its own set of darts defining it. Sewing darts together is defined by a permutation operation, and, it is the permutation operator that builds combinatorial reaps from darts. The darts, in the present invention, have two other properties: firstly, that they are named using integers; and, secondly, that they are pointers to other data which is usually content of some kind (for example, the names of people in a social network, or the names of atoms in a protein structure). As pointers, darts can embed various kinds of data: a single-dart implicitly defines a node and the embedding of the dart defines the data contained in the node, which may include other combinatorial objects or maps. The topological structure of the map is, therefore, distinct from the embedding which may serve to connect features of geometry or shape to the underlying topology or skeleton.

In fields of chemical informatics, and particularly, in the fields of quantitative structure activity relationship (QSAR) modeling, there are many topological indices that can be computed on the graph of the chemical under study; such as, the Hosoya Index, or the Wiener Index as well as many others [2]. These indices are essentially functions on the connectivity matrix of the graph underlying the chemical structure and also the properties of the atoms of the graphs (such as the electronegativity value of the atom). In the present invention, a general function used that is a function on the matrix derived from the combinatorial map of the network or graph and may not only represent connectivity but also the combinatorial structure of the paths in the graph; other functions can represent the weights or properties (i.e. the coloring) the of graph. Hence we refer to our modified function on the matrix as a matrix property function. In the present invention, many matrix property functions are computed to produce a vector of values.

The Q-MEDOIDS graph (correspondingly GMAP) partitioning is as follows: each node is defined by a vector with a d-dimensional vector of region labels corresponding to a Q-Medoid: the vector for the locales of the node sets are based on work by Gudkov and the idea of building regions by the work of Rattigan. In order to build the Q-Medoids that divide the graph into regions, use the algorithm steps as indicated below in steps 1 through 10 in the Q-Medoids Algorithm below.

Q-Medoids Algorithm

Figure 3:
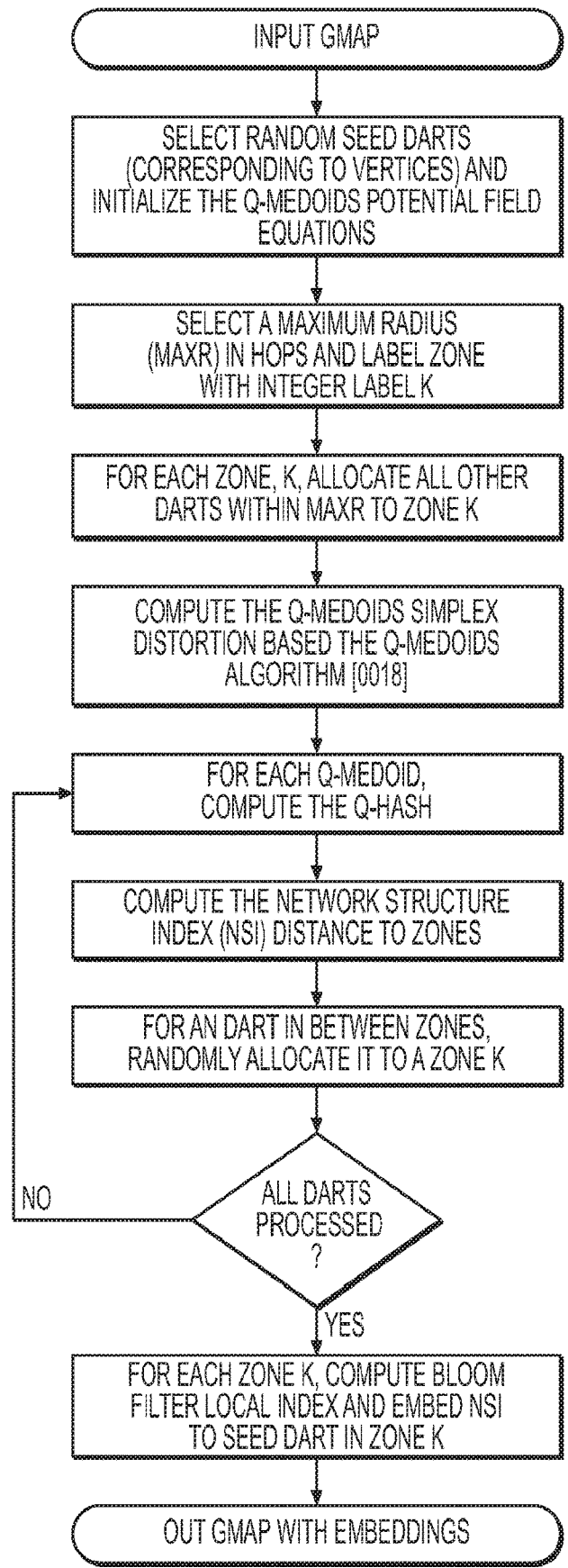
FIG. 3 depicts a Q-Medoids Partitioning Algorithm.

Now, referring to FIG. 3, the Q-Medoids algorithm includes three parts: first, the computation of the geometry of the graph by treating the vertices as virtual particles in order to generate weak clusters; second, the computation of the network medoids (zones or locales); and finally, the computation of the Q-Hashing summary of the local neighborhood and encoding hashes into local index Bloom filters. Each of these will be treated separately and explained herein. First, the weak partitioning of the graph is explained—a strong partition not required for the purposes of building the medoids as will be clear to those skilled in the art. The flowchart is detailed by the following explanations to accompany the steps, starting with the force field formulae:

1. Given a graph of n vertices, the n vertices are modeled as n virtual particles homogeneously distributed to form an n-dimensional GMAP, which we treat as embedded such that all n points are on the surface of a unit hypersphere in (n-1) dimensions. The GMAP needs to be partitioned into a collection of sub-maps: the preferred embodiment is to partition using the algorithm of Q-medoids.

Q-Medoids is different to K-Medoids because seeds are randomly selected (S1): let X be the average number of clusters one dart belongs to. Starting with a seed dart, each seed is grown into a cluster until all darts equidistant from the origin dart are accounted—in the case that some darts are unvisited, assign them to the nearest neighboring dart, randomly if required. Next, represent the polytope whose vertices contain the darts kissing a hypersphere surface and define the distance between any pair of darts (i.e. corresponding vertices) as:

$$|n_i - n_j| = \sqrt{\frac{2n}{n-1}} \; ; i \neq j$$

2. Define the ratio the repulsive to attractive potential forces by U acting on the vertices, n, of the graph be set with respect to a constant K as follows:

$$U(n_i)_{repulsive} / U(n_j)_{attractive} = K$$

Set K=1 for matrix rearrangement into a canonical form.

3. The n-dimensional GMAP will be composed of various equivalents to k-complexes, (i.e. simplicial complexes) such as 2 dimensional faces, 1 dimensional edges which are embedded on the (n-1)-hypersphere. For each of these simplexes define a simplicial sphere that circumscribes the simplex and denote its radius as r. The n-GMAP embedded on the unit (n-1)-hypersphere has distance between the center of the simplicial sphere and the center of the hypersphere as:

$$d^2 + r^2 = 1$$

Define the unit vectors of the simplicial complexes (the sub-maps), as s, of the GMAP. Calculate, using the unit vectors s, the n vectors of the original GMAP and the distance d:

$$d = \sqrt{\frac{n-s}{(n-1)s}}$$

and $$r = \sqrt{\frac{n}{n-1} \cdot \frac{s-1}{s}}$$

4. Calculate the angle between a vector point n and the unit vector of the simplex, s, as $\theta_s$:

$$\theta_s = \arccos(d) \approx \frac{\pi}{2} - \sqrt{\frac{n-s}{(n-1)s}}$$

5. Calculate the angle $\theta_p^q$ between the centers of two neighboring (i.e. adjacent simplices), p and q, in the GMAP as:

$$\theta_p^q = 2 \cdot \arcsin\left[\sqrt{\left(\frac{n}{n-p}\right)\frac{q}{2q}}\right]$$

6. Set the attractive (and respectively the repulsive, by change of sign) force as:

$$f(r) = -\frac{d}{dr} \cdot U(r)$$

7. Set the fixed point equilibrium as constant C, using epsilon, ε, and a multiple of epsilon as a threshold:

$$d \rightarrow \frac{r_i}{dt} = C; \varepsilon \leq C \leq k \cdot \varepsilon; k = \{1, 2, 3 \ldots n\}; 0 \leq \varepsilon \leq 1; \varepsilon \leq \frac{1}{n}$$

8. Calculate the forces using the rules as follows:
   a. Calculate attraction (negative sign) if the vertices are adjacent.
   b. Calculate repulsion if the vertices are not directly connected.
   c. If the vertices are terminal nodes on the graph, limit proximity to 1/ε.
   d. Repeat steps (a) through (c) until the fixed point equilibrium is reached by choosing one of (i) measuring minimal change as percentage of the prior values, or exclusively and preferred, (ii) repeat for a fixed number of iterations equal to the node degree.
9. Calculate the Q-Medoids using the rules as follows:
   e. Flood the graph stochastically by selecting seed nodes;
   f. For each seed node, check its neighbors to see if any have a higher node degree and select that as the new seed;
   g. The Q-Medoid is created by assigning a zone label to the seed;
   h. Proceed by the NSI Algorithm, using only one-iteration of instead of recomputing zones multiple times, because the teachings of Gudkov provide a dynamic particle field based computation that eliminates the need to repeat the computations of zoning for the distance to zone method as described in Matthew J. Rattigan, Marc Maier, and David Jensen. 2007. Graph clustering with network structure indices. In Proceedings of the 24th international conference on Machine learning (ICML '07), Zoubin Ghahramani (Ed.). ACM, New York, N.Y., USA, 783-790.
10. Return the set of Q-Medoids and the set of the NSI (network structure indices) of the Q-Medoids using the following (from Rattigan et al.): for each node u and region Z calculate the distance from the node u to the closest node in the region Z using the distance function $$D_{DTZ}(u, v) = \sum_d^N dist_d(u, \text{region}(v)) + dist_d(v, \text{region}(u))$$

The network structure index (NSI) of the Distance To Zone (DTZ) consists of a set of node annotations combined with a distance measure. NSIs are designed enable the discovery of short paths between nodes in a graph. Combined with the Q-Medoids process the DTZ produces independent sets of partitions: DTZ's record the distances between each node and all zones across each partition. If the partitions are overlapping, the choice can be to create non-overlapping zones by reassigning the nodes in overlap regions to one or the other region randomly. If the nodes are not pruned from duplication in different zones, the performance impact is negligible as the essential part of the structure is still valid as an approximation to graph distances—just that some will be redundant.

Figure 4:
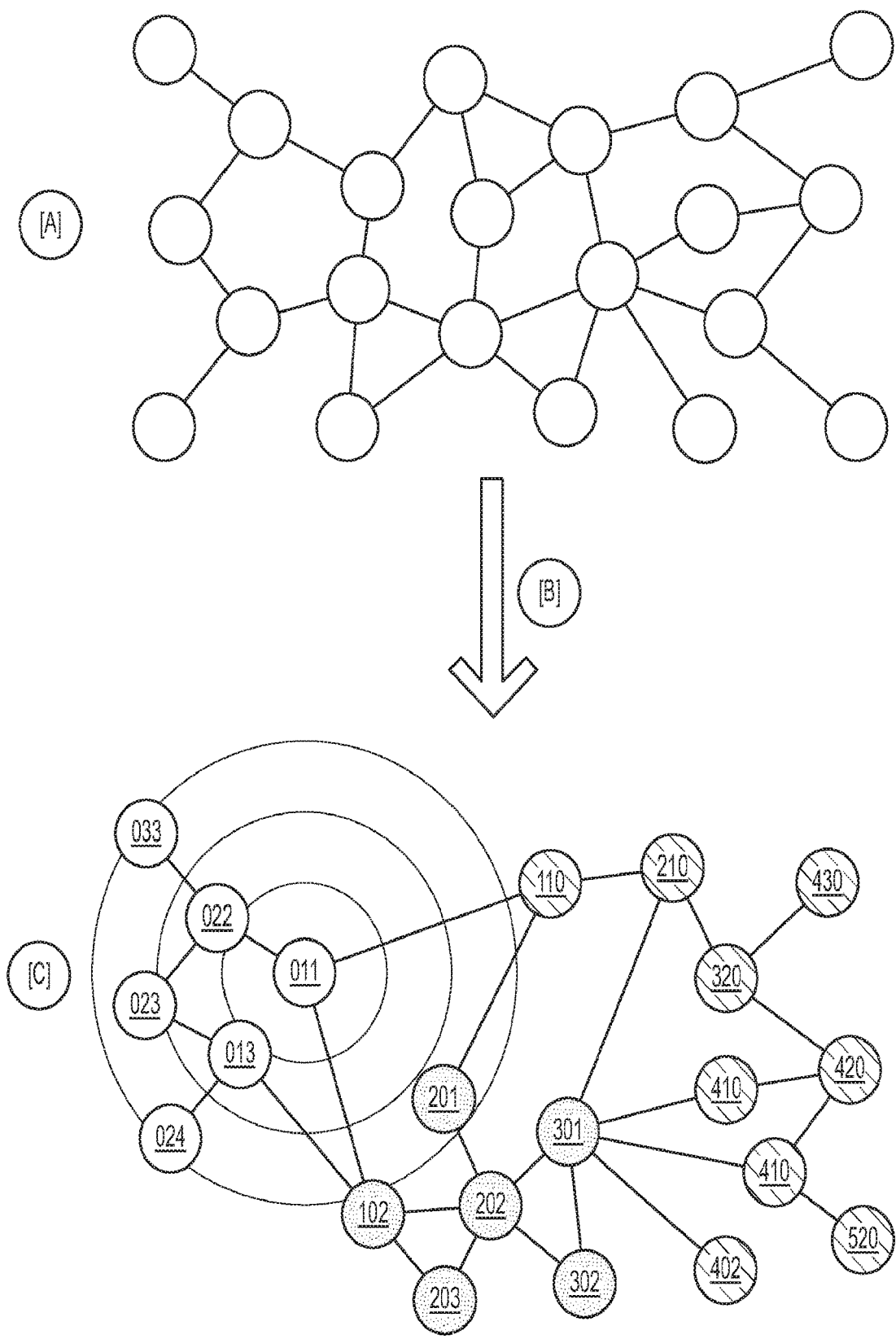
FIG. 4 illustrates a partitioning and zoning for Distance To Zone NSI.

FIG. 4 shows the DTZ on for each Q-medoid. The total number of Q-medoids is the dimensionality and the three numbers show the distances between regions and nodes: following Rattigan et al., the figure shows, a node in the extreme lower-left with index of [0, 2, 4], corresponding to the distances to the white, black, and gray colored regions. The distance from this node and to the node in the extreme lower-right is 4+5=9.

The distance measure vector is computed for each graph and added into the Cognitive Structure by reference to a spatial database to store and recall these values with respect to the Graph GUID.

Figure 5:
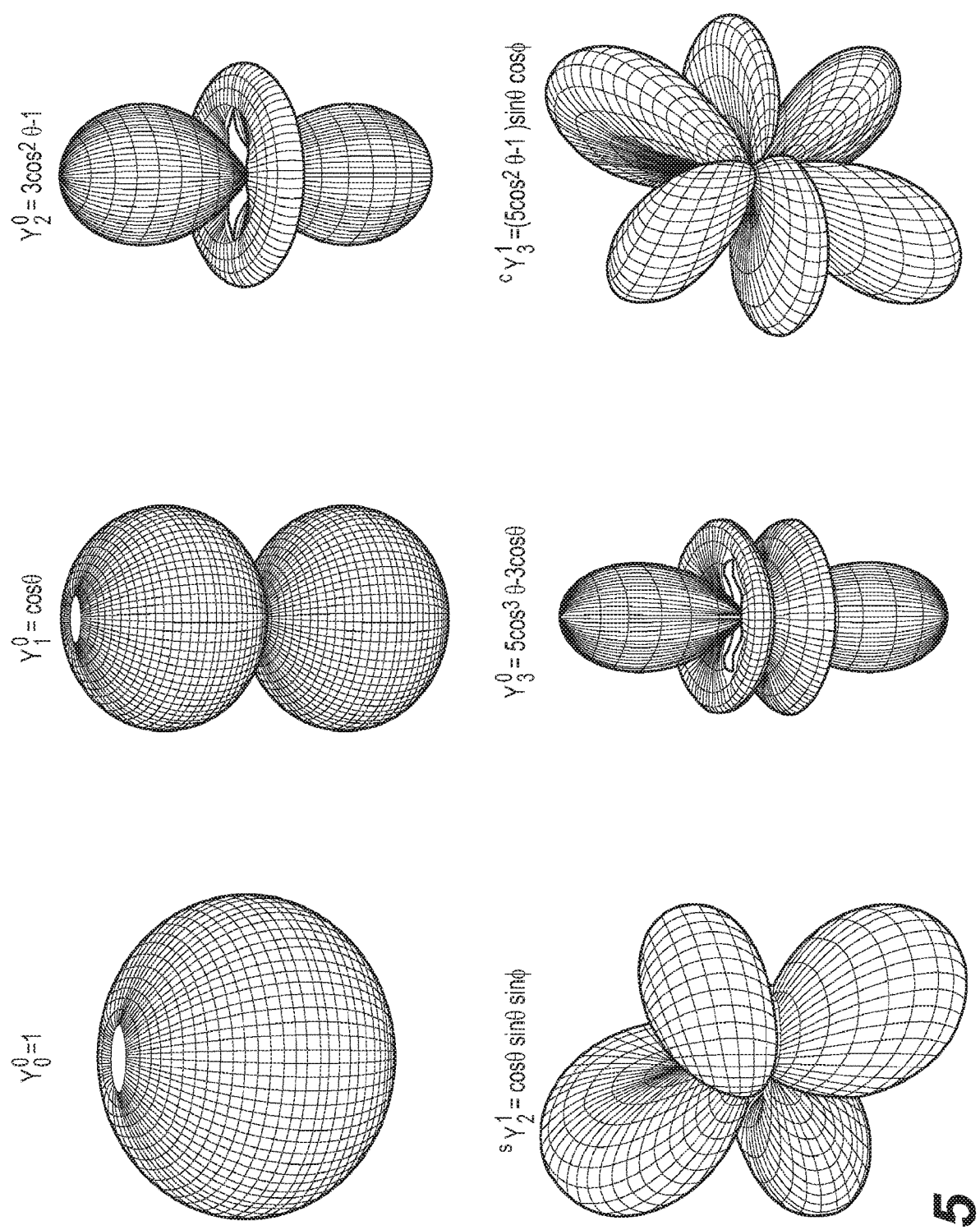
FIG. 5 illustrates an exemplary Spherical Harmonic Shaped Constraints for Quantum Particles and Interactions.
Figure 6:
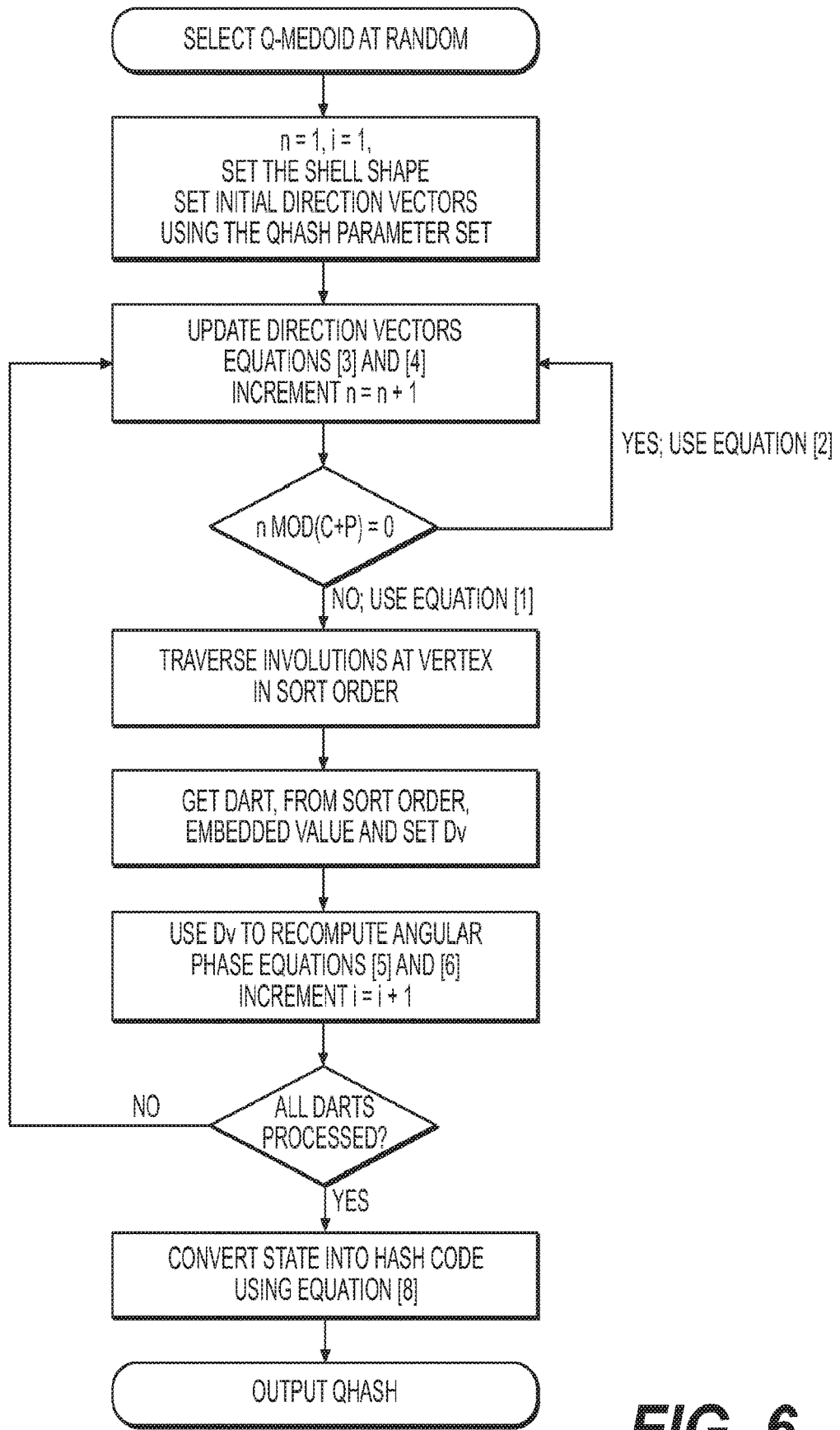
FIG. 6 illustrates an exemplary Q-Hashing Function.

Now, referring to FIG. 5 and FIG. 6, the Q-Hashing Function, or Q-Hash (or also, just "QHash") function is based on a variational interaction between a dynamical function and the labels around the vertex neighborhood as well as, separately, the rotational ordering of the darts about the vertex of the Q-Medoid of the graph and their related paths up to the MaxR (maximum radius in links of the medoid).

We start with the definition of the iterated dynamical interaction function, called the Q-function, that is a quantum-inspired virtual wave-packet behaving particle-like, that is dependent on the number of interactions as a virtual quantum particle and within a probability density functional shell: we call these virtual entities "Interactons". The interaction between the interactons and the shell boundary is subject to a model: for example, in the case that the interacton is electromagnetic and photon-like, then an appropriate behavior is that the interacton reflects at the shell boundary (which acts like a perfect mirror) into some other point within the shell, until it re-encounters the shell boundary condition. Examples of the boundaries of the probability density functions can be found in any textbook on quantum physics, but a few representative shapes are presented in FIG. 5. The presentation of an interaction as an electromagnetic wave-packet-like model does not limit the foregoing and gravitons or any other imaginary virtualized interactions and field or constraint geometry can be used as specified in the flowchart in FIG. 6. For reference, the teachings present in the paper V. V. Sreedhar, The classical and quantum mechanics of a particle on a knot, Annals of Physics, Volume 359, August 2015, Pages 20-30 are included herein for background on the concepts of constraints, paths and the movements of particles of which the dynamical formulae present have been inspired.

The Q-Function is presented here for the case of a 2D circular shell:

$$Q_n \begin{cases} Q_n = (C \cdot \phi(x_n + i \cdot y_{n-1}) - Q_{n-1}) \cdot \mathrm{mod}(C \cdot \pi); n \cdot \mathrm{mod}(C+P) \neq 0; & [1] \\ Q_n = \left(Q_n + \dfrac{C \cdot \pi \cdot D_v}{B}\right) \cdot \mathrm{mod}(C \cdot \pi); & [2] \end{cases}$$

The parameters, for 2D direction vectors, x and y, and other values are defined as follows:

QHash Parameter Set

C=Dimension
x=Cartesian x–coordinate=initial vertex weight
y=Cartesian y–Coordinate=initial edge weight
P=Prime Number
$D_v$=Datum (as float or integer) from the dart at vertex, v
B=2*Hash Width=maximum bit depth
Hash Width=number of bits (e.g. 128)

The function $\phi$ represents the phase angle for the virtualized electromagnetic wave-packet photon exhibiting particle-like behavior in the reflection within the shell. Also, of note is that the datum, $D_v$, if the label is ASCII or Unicode, then its integer value is used, and if a another quantity, then its float value used, else the datum must be mapped to an integer (which is its binary representation anyhow). It is the datum, that drives the variational perturbation of the dynamics and that is responsible, ultimately, for the hashing outputs.

For a 2D circular shell in the xy-plane (equivalent to the complex-plane), the behavior of the interacton can be modeled in Cartesian coordinates as:

$$x_n = \frac{\pm\sqrt{[\tan(Q_{n-1})]^2 - [y_{n-1} - \tan(Q_{n-1}) \cdot x_{n-1}]^2 + 1}}{1 + [\tan(Q_{n-1})]^2} \quad [3]$$

$$y_n = [\tan(Q_{n-1})] \cdot (x_n - x_{n-1}) + y_{n-1}; \quad [4]$$

Following the teachings of John King Gamble, Mark Friesen, Dong Zhou, Robert Joynt, and S. N. Coppersmith, Two-particle quantum walks applied to the graph isomorphism problem, PHYSICAL REVIEW A, 81, 052313 (2010), and Vladimir Gudkov and Shmuel Nussinov, Graph equivalence and characterization via a continuous evolution of a physical analog, cond-mat/0209112, 2002, we use two interacting wave-packets as John King Gamble, notes that it is not possible to distinguish certain graphs as Gudkov et al had conjectured with only one quantum or classical random walking particle on a graph but that two particles at least are needed: firstly, we point out that our approach applies to the locale of the graph, not the total graph, and second that our approach results in a hash summary of the local neighborhood of the vertex and its labels within the graph for the purposes of using the hash with other fast hashes in a Bloom filter. The hash may be used by itself within the graph without the Bloom filter for a local index however the preferred embodiment is to compute values with alternative hash functions (i.e. models of particles) and insert them into the Bloom filter. Hence, we can write the minimum bipartite Q-Functions, where Q(K) and K is interactions labeled a, b, c, . . . (as many virtual interactons as desired). The minimum preferred embodiment is 2 interactions and hence we have the following combinations Q(a,b) as one interacting pair, and then Q(b,a) as the other pair (in general, the formulae grow as the factorial of the number of interactons chosen):

$$Q_n(a,b) = \left[Q_n(b) + \frac{C \cdot \pi \cdot D_v}{B}\right] \cdot \mathrm{mod}(C \cdot \pi); \quad [5]$$

$$Q_n(b,a) = \left[Q_n(a) + \frac{C \cdot \pi \cdot D_v}{B}\right] \cdot \mathrm{mod}(C \cdot \pi); \quad [6]$$

Now, using the representative interacton formulae [1], [2], [3] and [4] as labeled in the preceeding, we can write a hash code of hash width, for example, 256 by using double precision floating point numbers and concatenating the most significant 64-bits (MSB) or choosing to concatenate the least significant 64-bits (LSB) or any constant offset within the bits: in other words, if the "+" symbol is interpreted as the concatenation operator, then and we represent the double application of the Q-function (i.e. twice for the interactons):

$$Q_{2n}(t) = Q_n(Q_{n+1}(t)); \quad [7]$$

Then:

$$\mathrm{QHash} = Q_{2n}(a,b) + Q_{2n}(b,a) + x_{2n}(a) + x_{2n}(b); \quad [8]$$

In order for the QHash to work effectively, the initial conditions has to be set up and stored as a default immutable preference within the Cognitive Memory configuration for startup. To do this, we use a reference consistent initializer with the constraints that:

$$Q_{initial}(a) \neq Q_{initial}(b) \text{ and } x_{initial}(a) \neq x_{initial}(b)$$

The QHash can be adapted to various bit-depths and is a uniquely designed for graph data but can also be applied to other arbitrary data as long as there is an interaction model between the input data and the state of the interacton dynamics as an iterated system.

For each labeled locale, or zone, from the Q-Medoids Algorithm, the QHASH is computed. For each concentric shell, a local Bloom filter index is computed and distances are combined into a locality sensitive hash for distances for the Bloom filter as explained later in this patent.

Referring to FIG. 4, the illustration in FIG. 4 [A] shows the input and through the process as described in the preceding and represented by the arrow [B], the zoned outputs, with the labeling as per the particle-field based zoning for the NSI algorithm to build the distance to zone maps, as per the teachings of Rattinger et al are shown in [C].

Figure 7:
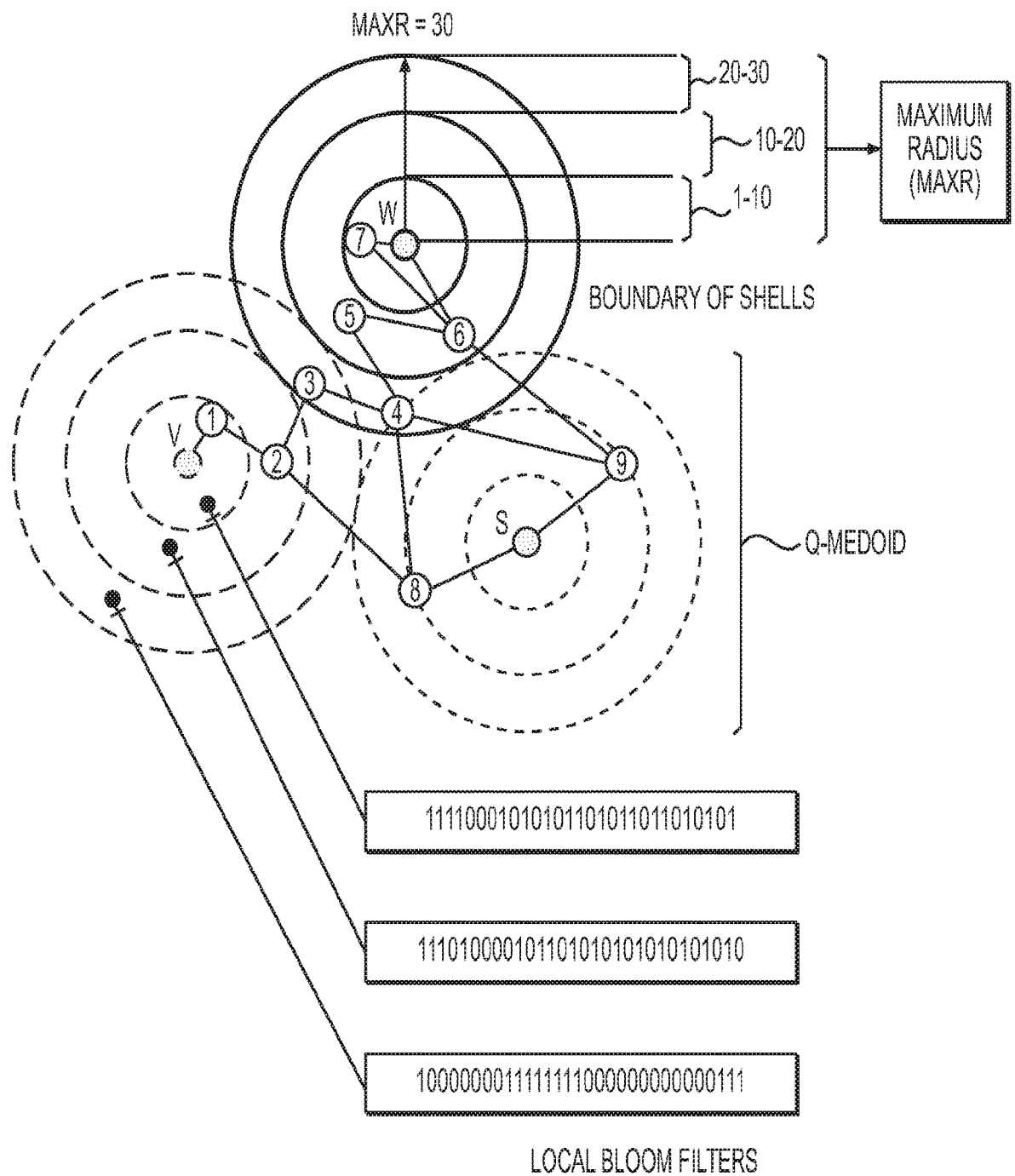
FIG. 7 illustrates an exemplary Localized Bloom Filter Index.

1. Given that the GMAP has been zoned into a collection of sub-maps using the algorithm of Q-Medoids as per FIG. 4 [C].
2. Now, choosing a 2D or a 3D or other constraint shape for the interacton particles, with options as shown in FIG. 5, compute the QHash function as per the method of FIG. 6 wherein the process starts with a random selection of a Q-Medoid
3. Given the labeled vertices from the steps as per FIG. 6, construct a localized Bloom index which stores a local representation in the neighborhood of the vertex, illustrated in FIG. 4[C], and therefore its medoid and its labels using a length-limited (up to some maximum length) shortest path discovery algorithm using the NSI algorithm of Rattinger et al.
4. Now, referring to FIG. 7, use two thresholds, MaxR and NumOrbits to control the build of the localized Bloom vertex:
   a. MaxR is the maximum radius of the neighborhood of the darts (respectively, vertex) using a given dart as the root starting point. For each increment of edge less than MaxR radius within the shell as illustrated in FIG. 7, which limits orbit of the local of the darts, the bounds of the range, the edge increment is performed breadth-first: this results in a set of involutions (i.e. edges) as a the locus of the dart (i.e. vertex). This process is continued, forming concentric circles shells) of edge increments breadth first around the root dart.
   b. Then number of concentric bread-first ranges is counted and can be either used as a stored value, or, if it is used as a constraint value that is fixed a-priori, then it controls the number of concentric ranges in the neighborhood. The concentric breadth can be defined by an interval range from a minimum radius which is defined as the first minimum radius containing at least two darts (respectively, vertices) as found from the K-medoids, up to a MaxR.
   c. The combinatorial map has locales and these locales are defined by involutions around the darts as found by the K-medoids algorithm: it is this geometric and structural process that we use to define and build a locale based bloom filter constructed in a special way unique to this patent.
   d. An orbit around the root dart, traveling around a concentric shell of the (hyper)path of (i.e. the innermost circle, or sphere or hypersphere) clockwise around, other darts (their edges or vertices of the original graph) are encountered and buckets are constructed as the dart to vertex involution index, one per concentric orbit.
   e. Darts whose shortest distance to the root dart that defines the starting vertex of the original graph (i.e. those in between the minimum and maximum radius of a concentric circle) are inserted into the bucket using a single complex valued binary number associated with both the direction of rotation around the vertex and the interval radius. Dually, for the edge index, instead of vertices, the edges are added into the buckets because the GMAP provides the dual representation of the original graph. Clearly, the dart to vertex involution index is likely, though not guaranteed, to be smaller than the edge to dart involution index since multiple darts at a vertex may share the same edge. FIG. 7 shows the general structure of these complex-binary valued bloom filter indices, one for each shell if the shell is occupied.

A query pattern represents that the matches of vertices v1 and v2 and, as per FIG. 7, should be within the δ distance and that this δ is the same for all edges for the Cognitive Memory database. If a logarithmic instead of linear scaling is used to construct the shells, then this must also hold for the entire database and all graphs and hence is a user chosen parameter for the search of substructure as well as encoding of the structure by the present method. There is a range [min(e), max(e)] associated for each edge e of the graph and for each edge, there are darts defining the involution that specifies the edge. However, different edges may have different ranges as a result of the Q-Medoids algorithm. The interval of the range yields the shortest distance between matches of the endpoints (vertices).

For each medoid, there exists a center v in each zone Z. By the triangle equality, the distance between zones is the shortest distance between v1 and v2 and is approximated by the distance to zone labels as per FIG. 4. Several implicit relationships exist. If, for example, an edge from v1 to v2 has a range [10, 20] and edge from v2 to v3 is in [30, 50] then the interval from (v1, v3) must be within [10, 70]. In the case that the range given by the distance to zone using the network structure index for the distance between v1 and v3 is [20, 80], the true implied range should still reside in [20, 70].

Since Cognitive Memory is designed to be very large, the indexing structure uses the contractions as well as a strong reliance in this preferred embodiment on locally summarized information using the Q-Hashing and Bloom filters. The benefit is that in dynamically updating graphs, only a small portion of the indexing structure needs to be modified. Given that the present invention uses an enhanced partition-based indexing structure of a set of (possibly overlapping) zones, then, whenever an edge or vertex is changed through a insert or delete operation, only the zones need be modified.

Figure 8:
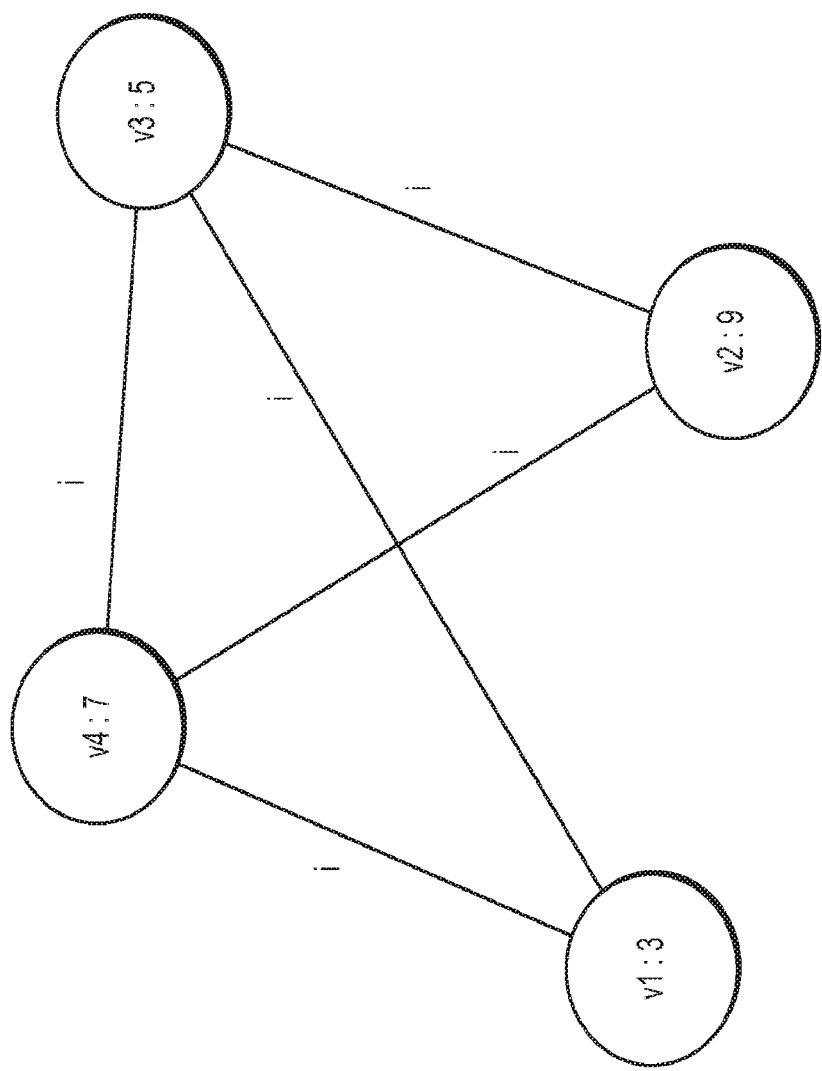
FIG. 8 illustrates an exemplary colored graph.

Referring now to FIG. 8, and given that we have explained how to represent networks as combinatorial maps, we illustrate a simple 4-node graph without the detail of specifying the darts and its detail as a combinatorial map. The graph of FIG. 8 is a simply colored (i.e. labeled) graph with nodes as v1:3, v2:9, v3:5 and v4:7 in which the node labels are v1, v2, v3 and v4; and, content as 3, 9, 5, and 7.

FIG. 9 represents the adjacency matrix of a network that represents the topological connectivity structure of the network of FIG. 8 but does not encode the coloring (i.e. values 3, 9, 5 and 7 of the nodes v1, v2, v3 and v4).

FIG. 10 illustrates coloring of the network of FIG. 8 encoding into a matrix in which the diagonals color the nodes with the values of the network in FIG. 8, as 3, 9, 5 and 7, on the diagonals, such that permutations of the vertices are equivalent to permutations of colorings. The matrix in FIG. 10 encodes a uniquely colored network. For an edge between node 1 and 4 we simply will write v14 for the edge. Referring to the graph of FIG. 8 and the matrix of FIG. 10 we define:

Algorithm to produce Discrete Colored Network Representation Codes (DCNRC):
1. Identify the labels and map these to darts with unique integer labels
   v11=3; v22=9; v33=5 and v44=7;
   [v11, v22, v33, v44]=[3,9,5,7]
2. Identify the connectivity between nodes
   v12=0; v13=1; v14=1
      v23=1; v24=32
      v34=1
   [v12, v13, v14, v23, v24, v34]=[0,1,1,1,1,1]

3. Transform [0,1,1,1,1,1] in a binary number by simple concatenation and add a leading 1 to preserve a leading zero of any:

[0,1,1,1,1,1]→[1,0,1,1,1,1,1]=95

We illustrate 95 as the decimal equivalent. The code [3,9,5,7] represents a unique coloring of the network in that it is a permutation from the set of all possible permutations (i.e. colorings) of networks 4. Convert this permutation into a unique index by using a pair of transformations, the:
   (i) Lehmer Code; and,
   (ii) Factoradic The Lehmer code of [3,9,5,7] is the vector [0,2,0,0] (in contrast, the Lehmer code of the vector [3,9,5,7] is the number permutation [4,11,7,10,1,2,3,5,6,8,9]).

The discrete code of [3,9,5,7] is computed as follows:
P=(3,9,5,7) is a permutation in $S_9$ and its Lehmer code is L(P)=[0,2,0,0]

Using the Factoradic base, from right to left, from 0!, we compute:

0×3!+2×2!+0×1!+0×0!=4+1=5

The number, 95, in Factoradic form is [3, 3, 2, 1, 0].

5. Combine the pair of numbers from step 3 and step 4, to now have a pair of numbers to represent the network such that the original network can be reconstructed:

Discrete Network Colored Representation
Code=DNCRC=95

The Base is the factorial base chosen, and the codes follow. In order to write the Discrete Uncolored Network Representation Code (DUNRC), we can simply substitute zeros in place of the diagonal elements and then repeat the process.

In order to recover the network from the code, the first number, 95 is used with the steps in reverse order to recover the colors (since the Lehmer codes and Factoradics are reversible). Note that it is not required to rebuild the matrix in order to rebuild the network since the codes can be used directly to build the network. In general, and for arbitrary networks, it is critical to generate a reversible code that can be subsequently encoding using Factoradic numbers and Lehmer codes.

Referring to the network of FIG. 8 and the matrix of FIG. 10, a node-function intermediate weighted matrix can be produced, FIG. 11, that illustrates a formula acting on the nodes of the matrix in FIG. 10. The weighting function on the nodes in this particular example, of FIG. 10, is defined as the reciprocal square root of the weights of each of the two connected nodes multiplied together to produce FIG. 11 and, FIG. 12 illustrates the computation of an example matrix property function as simply the sum over all weights in the matrix of FIG. 11. This formula illustrates the basic computation of matrix property functions, the majority of which are derived from the various topological descriptors and other graph invariant descriptors available in the literature and well known to those skilled in the art of chemical informatics and graph theory, and listed in [2]. Such a function is herein called the Matrix Property Function (MPF) and now, referring to FIG. 12, the matrix property function produces a number that is based on the input matrix, FIG. 10: 1.502952272305779. Again, the Matrix Property Functions are usually, though not always, based on so-called molecular descriptors. For example, when the colors, given by the node are not present, then, other functions can be used that are purely topological, such as, using connectivity indices like the Wiener or Hosoya index and other functions, as given in the reference of Roberto Todeschini and Viviana Consonni [2].

Referring to FIG. 13, we illustrate a method to convert any unlabeled symbolic sequence in which a network may be implicitly present, as the matrix of the path graph of the relational symbol-adjacency structure in the sequence. A network is unlabeled if there is no unique integer labeling of its nodes or edges. In addition, any network can be rewritten into a matrix of its path-graphs for any depth where the maximal depth is bounded by the maximum path length between to the two most distal connected nodes in the graph. However, for the purpose of illustration and simplicity, we shall use the example of an English word, in this case, the word "tester" which is made up of the set of 4 letters, {t, e, s, r}. FIG. 13 illustrates a matrix in which each element is a path connecting one of the 6 basic letter-pairs from the set of four unique letters as {er, es, et, rs, rt, st}.

Algorithm for Encoding a Sequence of Unlabeled Symbols into a Graph

1. A source of prime numbers generates the north prime number in response to a number, n, being presented where the $0^{th}$ index is 1, $2^{nd}$ is 2, $3^{rd}$ is 3, $4^{th}$ is 5, etc . . . which is to be used for labeling; and, 2. Each unique letter is replaced by a unique prime number where, for this specific example, the labeling rule is that the character code in Unicode or ASCII, or a dart's integer value that points to the letter, is to be used to index the n-th prime number;

3. Each letter (or symbol) is given a unique address, and in the case of the sequence of symbols, this is an integer position count starting from the first symbol at position 1 indexed by the prime number from step 2 preceding. The code for tester using this encoding scheme is, therefore: [641,547,631,1282,1094,618].

4. For each pair of letters, the path between the letter pairs is measured as a count of the intervening symbol transitions. Therefore, between the letter "t" and "e", there is a one transition. Between the letter "t" and "s" in "tester" there are two transitions (from t to e and from e to s) as well as one transition (backwards from t to s). All paths are counted up to a user defined maximum, k-depth. For the example of the word tester, the depth is set to 5.

5. Table 1 refers to the final mapping between the letters and the Code Value where the position value, representing the dart that points to the letter, and the Occurrence Value multiplies the prime value from which Table 2 can be derived as the matrix of path lengths (up to depth of 5). The depth is a user chosen small parameter and need not cover the entire graph, usually between 2 and 7.

6. The resulting matrix of the word "tester" expressed as the path matrix and this is specified in Table 2 and illustrated in the FIG. 13 (2), which can be easily converted into network (1) in FIG. 13, made up of the original letter pairs, shown with dotted lines in FIG. 14 (1).

TABLE 1

Example Mapping from Darts to Letters to Code Values for the word "tester"

| DART | Character | Occurrence | ASCII Code | Indexed Prime | Code Value |
|------|-----------|------------|------------|---------------|------------|
| 1 | t | 1 | 115 | 641 | 641 |
| 2 | e | 1 | 101 | 547 | 547 |
| 3 | s | 1 | 114 | 631 | 631 |
| 4 | t | 2 | 115 | 641 | 1282 |

TABLE 1-continued

Example Mapping from Darts to Letters to Code Values for the word "tester"

| DART | Character | Occurrence | ASCII Code | Indexed Prime | Code Value |
|---|---|---|---|---|---|
| 5 | e | 2 | 101 | 547 | 1094 |
| 6 | r | 1 | 113 | 619 | 618 |

TABLE 2

Path Network Matrix for the word "tester"

| Letter-Pairs | 1 | 2 | 3 | 4 | 5 |
|---|---|---|---|---|---|
| 547:619 | 1 | 0 | 0 | 1 | 0 |
| 547:631 | 1 | 1 | 0 | 0 | 0 |
| 547:641 | 2 | 1 | 0 | 1 | 0 |
| 619:631 | 0 | 0 | 1 | 0 | 0 |
| 619:641 | 0 | 1 | 0 | 0 | 1 |
| 631:641 | 1 | 1 | 0 | 0 | 0 |

Figure 14:
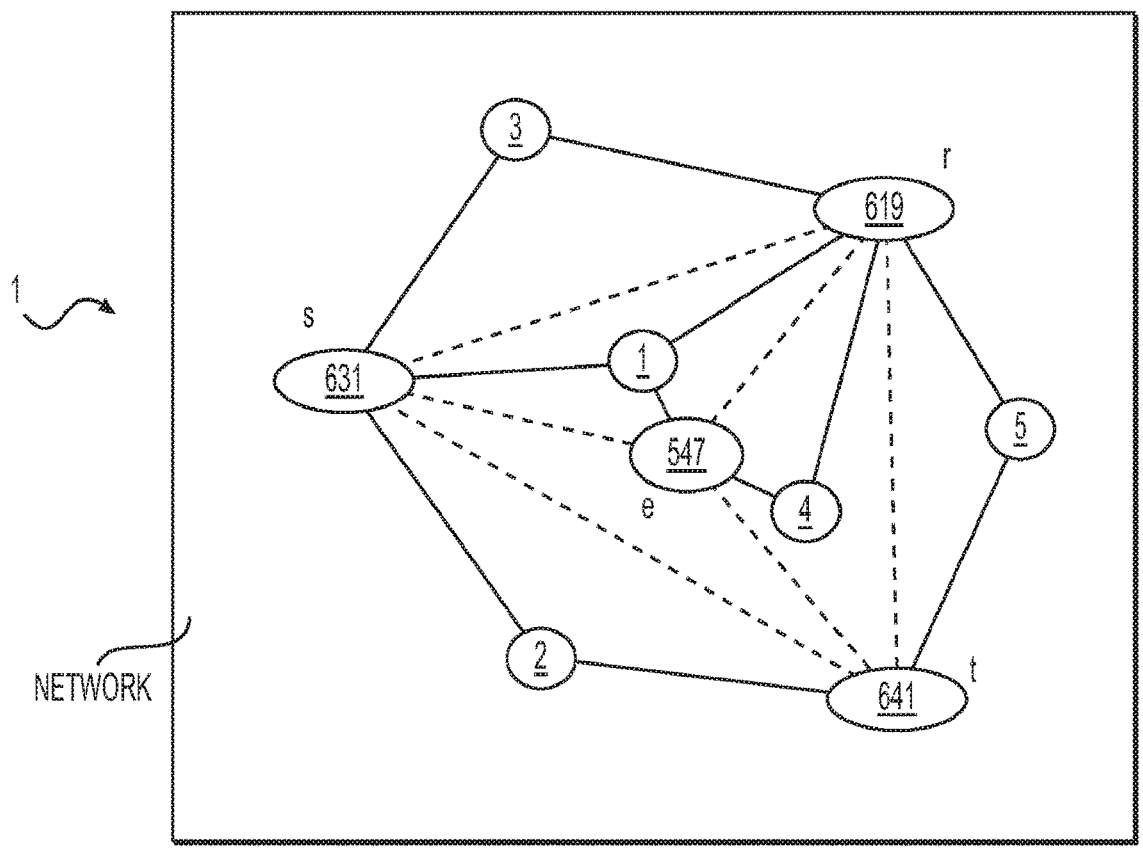
FIG. 14 illustrates an example Colored Path Matrix of the Network of "tester" using Encoding in Table 2.

FIG. 14 (1) illustrates the encoding of strings using the distance between letter-pairs in the string as a path graph, using prime numbers to represent the individual letters. For repeating letters, positional occurrence multipliers are used so that prime factorization in decoding is very simple. Darts that are used to form the combinatorial map are always numbered consecutively. While the algorithm has been illustrated for a graph representing text, the graph may represent images or any other data that is representable using a graph of relationships. The matrix in FIG. 14 (2) of the resulting network can then be written and encoded as illustrated earlier in this present invention, referring the methods accompanying FIGS. 3 through 7. The process used to encode the word "tester" is illustrated to show that the encoding method, namely assigning unique identities to the nodes embedding the linear stream (of letter pairs) can be used to encode any linear symbol stream as a graph. Without limitation to pairs of symbols, or bigrams derived from statistical analyses, groups of three symbols or trigrams can be used to formulate the graphs as well, for example, in processing and converting text into text graphs, it is useful to use bigrams or trigrams and in the preferred embodiment of Cognitive Memory, bigrams and trigrams are used to convert symbol sequences into networks and subsequently into a GMAP. Any input data must be converted by these methods if the data is not already a GMAP.

Figure 15:
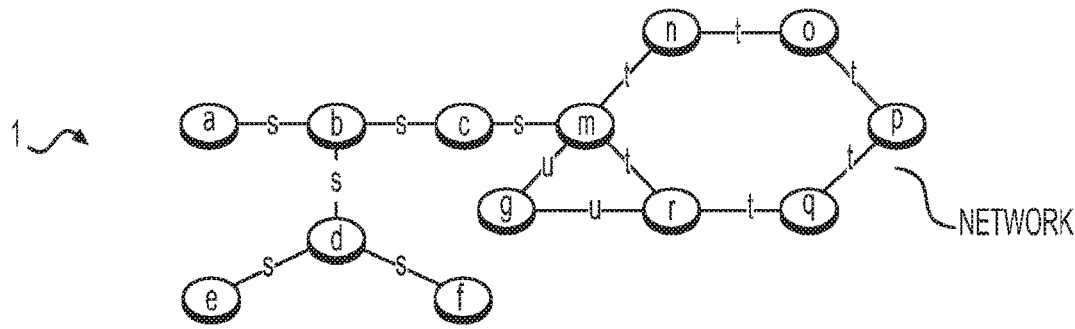
FIG. 15 depicts a DUNRC of Matrix Representing the Graph.

Referring now to FIG. 15, the network (1) is represented, for the purposes of illustration, into the connectivity matrix, (2). The connectivity matrix provides the discrete codes, from the upper-triangular set of numbers, and these codes can be rewritten as an integer (3) which can be converted into a Factoradic number (4) and finally into a code needed to reconstruct the matrix and therefore the graph as the code in item (5), called the DUNRC (Discrete Uncolored Network Representation Code). In the case of a colored network, the methods outlined earlier are used to produce the DCNRC (Discrete Colored Network Representation Codes).

Figure 16:
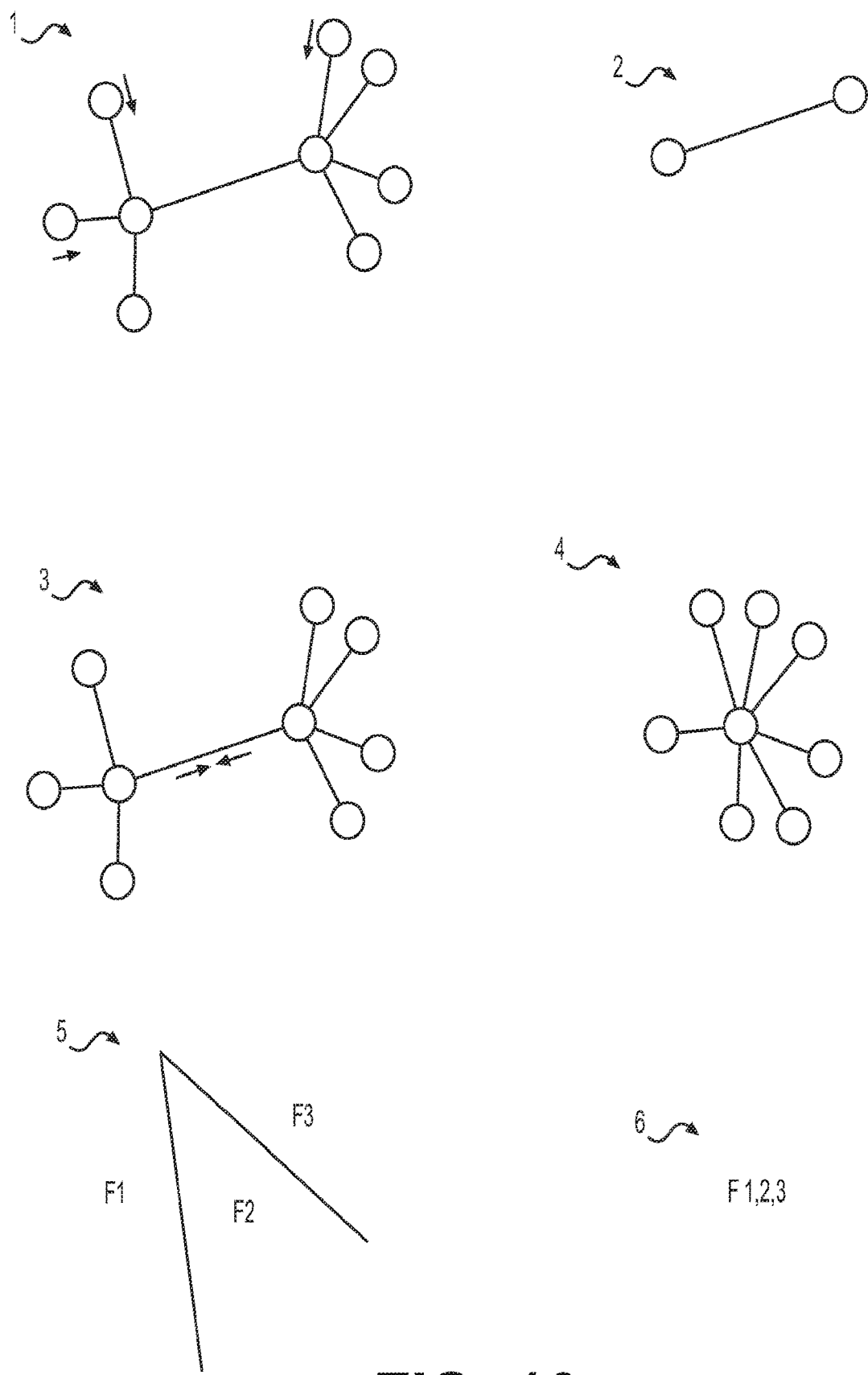
FIG. 16 illustrate according to an embodiment, exemplary Contraction Rule Operations.

Now, referring to FIG. 16, the methods for Contraction Rule operations are illustrated. Contraction Rules merge or collapse the network from a larger structure to a smaller structure by applying topologically focused contractions. This means that contractions occur at the same dimensionality before progressing to another dimensionality, or, in other words, contractions of Generalized Combinatorial Maps begin at a given k-cell, and are applied to all k-cells before being applied to another dimensionality, not equal to k.

Now, referring to FIG. 16, we can specify the contraction operations in the following rules:

Contraction Rule Types
1. For each k-cell, where k=1, an edge-contraction (1), is defined as the merging of nodes adjacent on the edge (2) and a re-labeling of the edge and embedding into the syntactic expression tree of the edge/node remaining; or,
2. For each k-cell where k=0, a node contraction (3) is defined as the merging of edges adjacent on a node (4), and a re-labeling of the nodes and embedding into the syntactic expression tree of the edge/node remaining; or,
3. For each k-cell where k=2, a face contraction is defined as the merging of faces (5) onto adjacent edges (6) and a relabeling and embedding of the faces into the face/edges/node remaining, and, for each k=3, the volume contraction (not shown in the FIG. 15) is a contraction of volumes onto adjacent faces; such that, for any k, the contraction always results in a k-1 dimensional object with a relabeling and embedding into remaining lower dimensional object.

Figure 17:
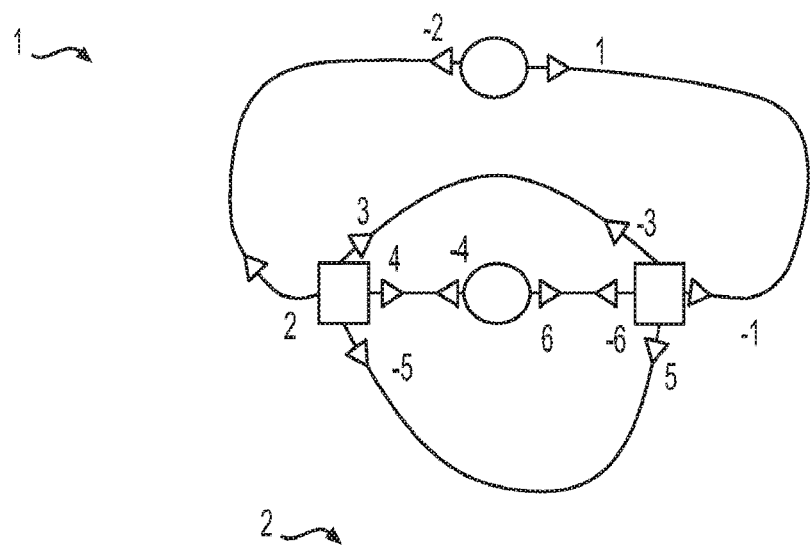
FIG. 17 depicts a dual of a GMAP.
Figure 17:
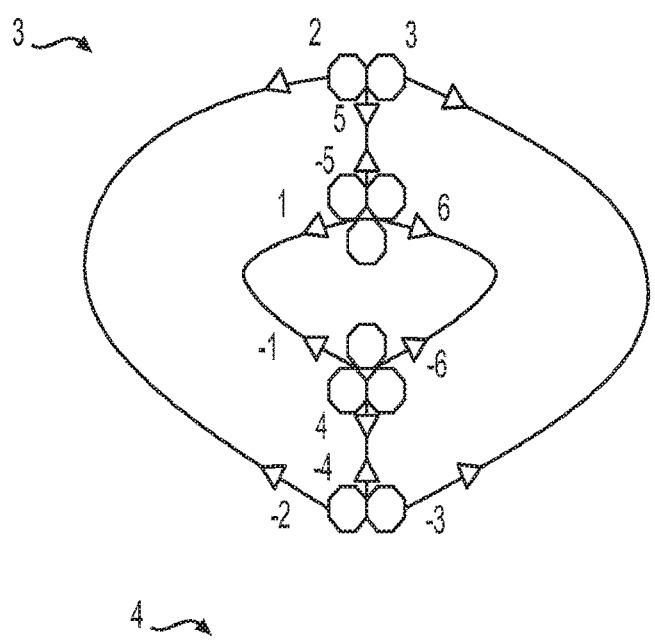

Referring to FIG. 17, GMAP (1) is shown with an example node described as an involution of its darts (2) and by simple inversion (i.e. reversing the orientation of all darts), the dual GMAP (3) with resultant inversion permutation of darts (4) produced. Contraction Rules, as defined in FIG. 16 are implicitly updated in any GMAP due to implicit dual structure maintenance that provides the added benefit of speed, flexibility, parallelizability to the present invention, and hence, the dual map is always available. The methods, although related to work by Kropatsch [7], sews empty-darts in order to eliminate structures with self-loops that can, therefore, be contracted regularly by the rules.

Figure 18:
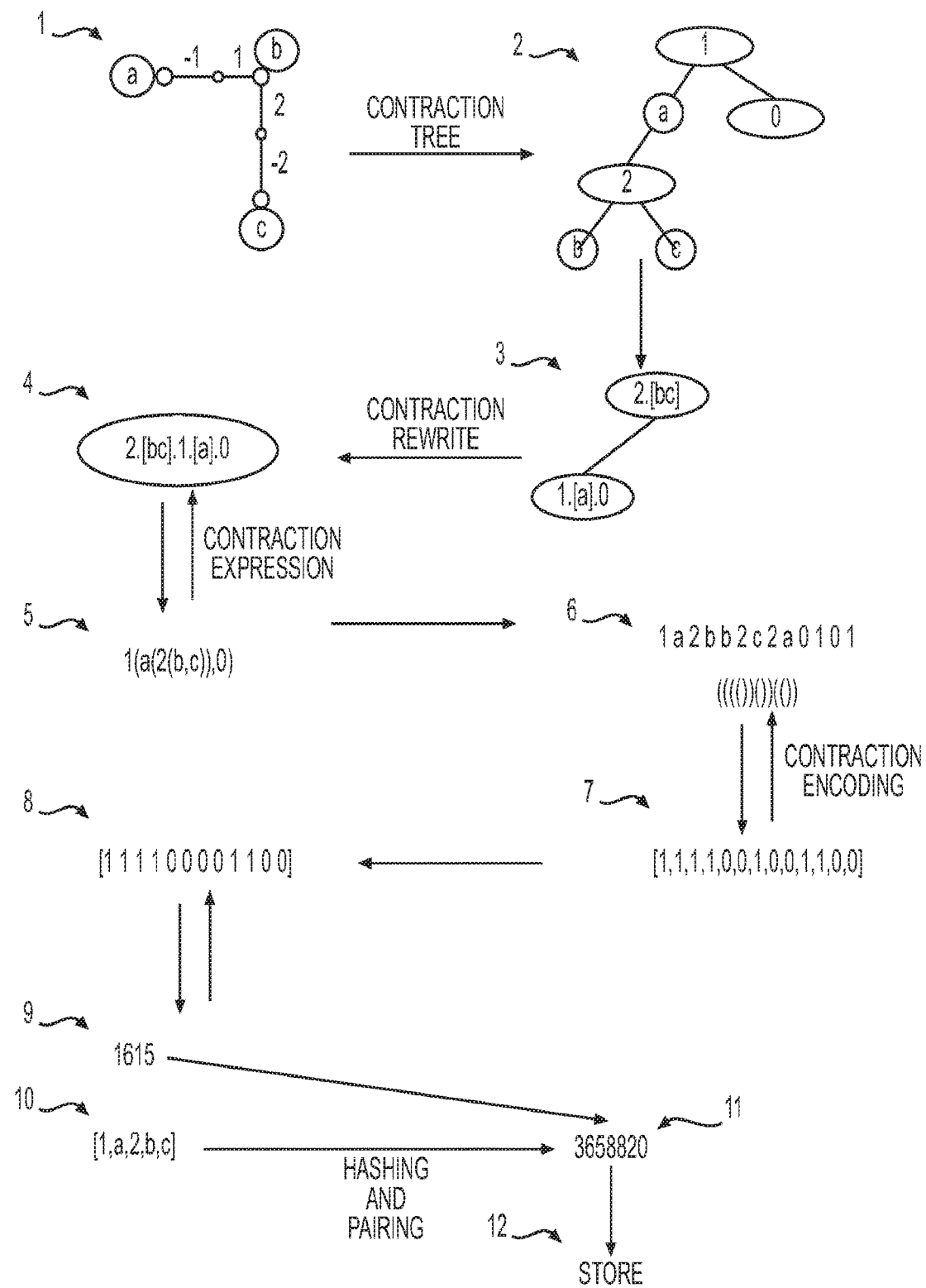
FIG. 18 illustrates contraction and encoding of a Partial Generalized Combinatorial Map.

Now, referring to FIG. 18, we illustrate a small combinatorial sub-map (1), that may be a part of a larger GMAP. One of the key elements of the present invention is the coupling of contracting the map, generating a code and then iterating the operation until no more contractions are possible. FIG. 18 (1) is rewritten into a binary tree (2) that represents the permutation of the darts and the embedded objects (namely, the labels a, b, and c). The encoding in FIG. 18 (6) of the present invention is inspired from work by Jacobson [8], Tarau [10], and Munro and Raman [9]. Jacobson's succinct tree representation [8] is based on the level order unary degree sequence of a tree that lists the nodes in a level-order traversal: the root node is first, then all of its children, from left to right, followed by all the nodes at each subsequent level (depth) of the tree and encodes their degrees in unary (i.e., a sequence of 1's terminated by a 0) order.

The parenthesis language sequence of a given tree per Munro and Raman [9] can be obtained by a depth-first traversal of a binary tree, and outputting an opening a parenthesis each time a node is visited followed by a closing parenthesis after all its descendants first, then all of its children, from left to right, followed by all nodes at each subsequent level (depth) of the tree. Once the encoding is accomplished, then, opening and closing parentheses are replaced with 0's and 1's respectively to obtain the binary bit vector sequence bits. Tarau [10] produced a code based on finite permutations of hereditarily finite sets starting with Ackeimann's function and deriving a reduced code and an optimal encoding which can be used to encode the network as well. In the present invention we are not dealing with only trees but arbitrary graphs, the parenthesis language is expanded with square parenthesis prefixed by the integer of the dart in the locale being contracted. The representation allows cycles and other structures to be codified using the combination of round, square parentheses and darts. As nodes, using dart operations, are contracted, the topology of the graph is changed. The contraction trees originate as multi-way trees and are converted by standard methods into binary trees that provide a complete history of the graph.

Therefore, for each contraction operation, there is a set of relabeling rules as follows, referring to FIG. 18 (1) through (4):

Syntactic Contraction Tree Construction:
1. Start with an empty tree and the input GMAP, (1) to produce binary tree (2).
2. Use the symbol for square brackets "[ ]" to wrap expressions for k-cells into k-1-cells and use the round brackets "( )" for grouping cells at level k in permutation order. For each contraction operation, use the dot "." to represent the presence of a contraction. All other symbols are the labels of darts. Then,
3. Add a branch to the tree whose node contains the name of the contraction operation used by value of k (for example, k=0, then it is a node contraction, if k=1, then it is an edge contraction, if k=2 a face contraction); and,
4. Add a child node for the relabeling of the k-cells of G.
5. For each k-cell of G, and each orbit of darts affected by the contraction rule:
    a. If the orbit of the darts is at a dimension k, then use square brackets and a dot to wrap the expression at k-1 by a label for the orbit of darts, and, create a new dart and sew the new dart with the label at k-1; else,
    b. Append the label of the dart at k to the object being contracted at k by sewing.
6. For each leaf, add a new contraction operation node if a contraction operation is available producing FIG. 18 (3); else,
7. Stop and return the completed contraction tree and its expression as shown in the node in the FIG. 18 (4).

Contraction Tree Expression Encoding
1. Start at the top of the tree, (e.g. FIG. 18, (2));
2. At each node open a round parenthesis;
3. For each edge, not part of a single descent, open a square parenthesis prefixed with the dart integer of the positive side;
4. Repeat (2) and (3) until no further (3) can be performed; then,
5. Fold each pair of square parenthesis into a functor named by the integer code of the dart to which it belongs; then,
6. At each edge of descent ad a closing round parenthesis;
7. Continue until no more nodes or edges have been visited.
8. Replace all left round parentheses by 1;
9. Replace all right round parentheses by 0;
10. Output the binary code and stop.

These algorithms provide a lossless record of the graph at all contraction levels. Each non-leaf node has left and right children that represent the two nodes used to create the contraction. Each leaf node represents a node that was contained in the original graph. In an augmented contraction tree, the operator used to merge the darts can be stored by reference as well, if needed.

Thus, and referring to FIG. 18, in detail, applying an encoding using parenthesis notation to represent (2) as (3), we further rewrite (2) to produce (4). No further contracting rewrites are possible. The contraction expression (5) is produced from (4) by using the darts as the names of functors in to produce a Prolog language expression (5). Using (5), it is trivial to convert this into a pure parenthesis expression with the symbols from the Prolog expression (and implicitly its tree) (5) as (6). Replacing the left parenthesis with 1 and right parenthesis with a 0, the list of 1's and 0's in (7) is produced. Simple concatenation of the symbols in (7) produces the code (8). The decimal equivalent of (8) is (9) and using the methods of Tarau [10], hashing the symbol table of the symbols (1) into a list of small integers are then encoded as a natural number using in Tarau [10], and then aggregated with the result of (9) of 1615 into pair of numbers using that, using the pairing function of Tarau [10] produces the code (11) 3658820 which then is added to a store for the input (1).

Figure 19:
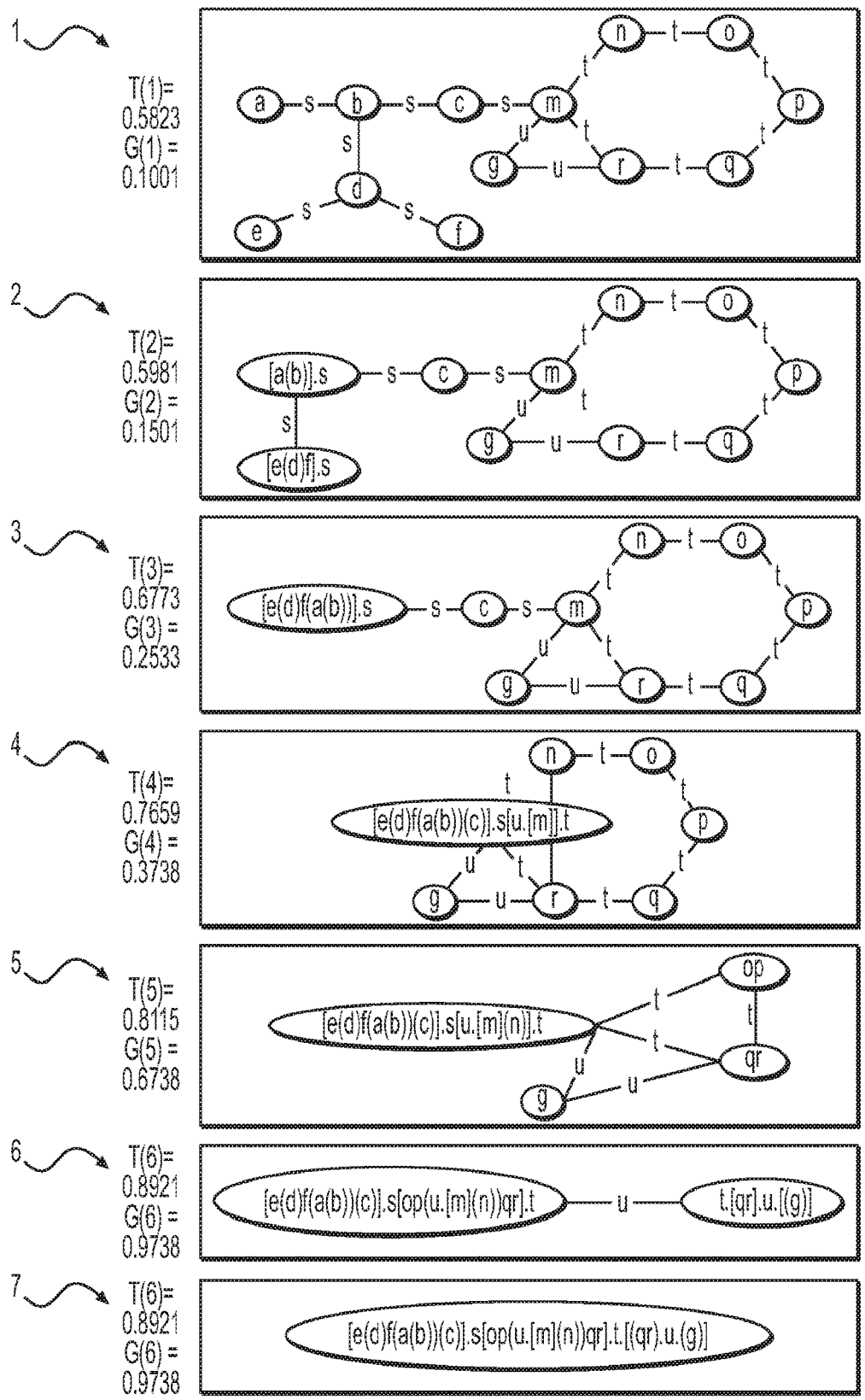
FIG. 19 illustrates Coupled Contraction and Property Function Computation Operations.

FIG. 19 is the key and central part of the present invention in that it illustrates the method of coupling a set of contraction operations with an encodings and the synchronized computation of matrix property functions for topology and geometry into a single partial structure that is stored in a database, and then this process is iterated by contraction until no further contractions are possible. The network drawn from the graph in FIG. 1 (1) and reproduced as FIG. 19 (1) is used to produce a sequence of vectors that represent the behavior of the matrix property functions with respect to the contraction transformations of the graph, and it is these behaviors (i.e. given by the numeric outputs of the functions) that are stored in the spatial vector store (usually a Multi-Vantage Point Tree). Therefore, and now referring to FIG. 19, we write the main algorithm:

Contraction Rule Algorithm:
(i) Choose an adjacency relationship (i.e. the k-cell for contraction) and the order of edge-types for the Contraction Rule (as was illustrated in FIG. 16). In the case of FIG. 19, and for purposes of illustration only, the ordering of link types is {s, t, u} by lexicographic ordering and hence, nodes around the edge type "s" will be contracted first, and when contraction can not proceed further around "s", then the next edge type to be contracted is "t" then, when neither s alone nor t edge-types alone can be contracted, their combination of "st" or "ts" adjacent edge types will be contracted. When neither "ts" nor "st" adjacencies can be contracted, then and only then are the "u" edge types considered for contraction (as was illustrated in the contraction expression in FIG. 18). In each case, permutation ordering is retained and contraction proceeds according to lexicographic combination ordering. In the case that lexicographic ordering is replaced with integer ordering per Tarau [10], then contraction proceeds with numerical ordering and combination. For top-down contraction, choose the k-cell with the highest k-value and for bottom-up contraction choose the k-cell with the lowest k-value. The highest k-value will merge hyper-volumes, and then faces, and then edges, and lastly, nodes while the starting with the lowest k-value will perform the reverse. For each contraction operation, labels are merged maintaining their pet mutation order using the Contraction Expression encodings as illustrated in FIG. 18. Therefore, and for illustration purposes only, in FIG. 19 (1) for contraction of the nodes {e, d, f} with respect to edge {s}, we produce the new labeling:[e(d)f].s shown in FIG. 19 (2) which identifies that (d) is the node around which e and f are contracted over the edge type "s".

The rule of choice for contraction of a network (GMAP) at any given level is:
a. Choose the node with highest count of darts (i.e. the highest α0-orbit of darts, which for nodes is simply just their cardinality at the node) and make this node the center around which contraction occurs when the contraction rule follow node-adjacency contraction. In the case of arbitrary elements, the element of the highest k-cell is chosen first based on the cardinality of the orbit of the darts after the contraction ordering (breadth-first or depth first) has been chosen;
b. Label the highest k-cell using its label in round parentheses;
c. For each connected node concatenate the node labels, retaining their permutation order about the k-cell and append these to the syntactic expression for the parenthesized node label of the k-cell.
d. Wrap expression from (c) preceding with square parentheses using the "." (i.e. dot symbol) to denote the link type connecting the symbols.
e. Repeat steps (a) through (d) for each subtree neighborhood of each k-cell in the contraction ordering chosen until no further labels can be merged at the given contraction level.
f. If any k-cell of dimension k does not have a label (for example, a set of faces is not labeled as face-1, face-2 etc . . . ), then the orbit of the darts of the k-cell, in permutation order, is the label. This label may be substituted with another label, provided that a pointer is stored to memorize the face label darts to their symbolic (or numeric) name.

(ii) For the contraction adjacency relationship chosen, delete the darts preserving their permutation order by moving the labels into a syntactic expression tree for each pair of adjacent elements merged. Labels can be generated for, respectively, hyper-volumes, faces and edges respectively as required, following the method of FIG. 18. In some cases, it may be useful to allow some k-cells to be partially defined, thus leading to open combinatorial maps. The method is to add a specially marked empty-dart to the set of darts, and to allow darts to be sewn with the empty-dart. Since both darts of an edge are simultaneously contracted or removed the contraction level may be encoded on only one dart of each edge since the positive dart if is encoded by the sign: only half the darts need to be stored since the others are implicitly defined by the involution.

(iii) The highest contraction level, shown as item FIG. 19 (7), is either a single node (for node adjacent contraction) or a single volume or face respectively for volume or face adjacent contraction or a single edge for edge-adjacent contraction. In the case that the contraction rule is to contract undirected edges first (i.e. four darts at a time, or, in the case of directed edges, 8 darts) with the rule that undirected edges or symmetric relations are stored using one pair of darts for each edge, and directed relationships from one direction to the other for each edge, either match the signs of the undirected darts on the edge, or, for the reverse direction, do not match the signs of the first pair of darts defining the given edge.

(iv) A table of all darts is maintained and for each contraction operation, a contraction expression tree is maintained, in which the permutation is stored encoded as per FIG. 18 for the combined labels of the network, optionally using a standard technique such as a hash map.

Referring to FIG. 19, we repeat that the key and most important part of the present invention is the coupled dual operations, which are absolutely critical to the present embodiment. Firstly, while the illustrations show only one matrix property function to generate a value of a matrix (as in FIGS. 10, 6 and 7) the preferred embodiment uses k-different functions to produce a k-dimensional vector which then is stored as a point in a k-dimensional multi-vantage point tree and also, extracted as a value to fit into an k-bit Bloom Filter; and secondly, the operation of contracting the GMAP either by deleting adjacent elements which, in the simplest case involves merging nodes and deleting darts or by merging adjacent edges and merging the nodes by retaining the permutation ordering of the dart embedding (i.e. labels) and in higher-dimension, deleting face adjacent darts and merging faces into a regular permutation of the face labels into a single node as specified by the contraction rules. FIG. 19 illustrates contraction by nodes and subsequently on edges by deleting the edge and concatenating the labels of adjacent cells into new cells (i.e. nodes). The GMAP model automatically enables the dual-graph to be generated (as illustrated in FIGS. 18 (1) and (3)) such that nodes become edges and edges become nodes: then the methods of the present invention can again be computed on the dual graph to produce a dual set of values, whenever needed. At each contraction, the network structure represented is collapsed into a smaller k-1 dimensional form, although contraction rules can be specified that contract from k to k-2 or, in general, to k-n for k>n. In general, contraction operations are accumulated and stored in an expression tree that represents the number of operations, iterations and results of contractions on the structure. The number of iterations is proportional to the size of the structure.

Referring to FIG. 19, (1) through (7) we show an example network that is labeled and successively contracted. In this case, for each contraction iteration, with zero iterations for FIG. 19 (1) itself, we can compute a function on the network graph. A plurality of matrix property functions can be computed that together represent a vector. In the case of the example, we have, for illustration purposes only, computed a one-element vector for each iteration (i.e. contraction level). The set of vectors at each level represents the behavior of the function acting on the graph. FIG. 19, (7) represents the point at which no further contractions can be made and is a stopping contraction.

Referring to FIG. 19, in detail, the following sequence of operations occurs:
1. A input graph has a multiplicity of nodes that embed data, represented by the node labels {a, b, c, d, e, f, g, m, n, o, p, q, r} and edge types labeled as {s, t, u}. A Global Unique Identity Designation (QUID) is generated, "gmap1". For example, and only for purposes of illustration the graph could represent a chemical structure in which the node labels represent different atoms and the edge labels the types of bonds; or, the graph could represent a social network as a graph with nodes representing people and edges representing their types relationships, such as email exchanges, co-authorship of papers and phone-calls. In any case, the data can be represented by a set of edges and nodes as a graph and, by the methods specified earlier, the graph is converted into a GMAP. The example input graph is illustrated as item (1) in FIG. 17.
2. At a minimum, two property values on the network are computed called respectively T (for "Topological") and G (for "Geometrical"). As shown in all the items, (1)

through (7) of FIG. 19, each graph has a T and G value. T represents a topological descriptor of the network and G represents a data or geometric descriptor of the elements in the network. The topological descriptor, T, is computed on the connectivity or path network of the data and G is computed using the weighted or colored network. Examples of functions for T include, but are not limited to the Hosoya Index, the Wiener Index, the Randic Index and examples for G include, without limitation, and specific to data, for chemistry for example, bond-order values, or atom electronegativites, or for general networks, any potential function as weights for the nodes located at the nodes and forces as weights for the edges with any rule to regularly combine these into a numerical value. Examples of functions for nodes, for example in web-graphs, include the in-degree and out-degree of directed edges to a node, and an example of a node weight is the ratio of input degree to output degree.

3. For each contraction operation, with the first operation illustrated in item (2) of FIG. 19, the operation is done breadth-wise, though depth-wise contraction can be chosen also. The node labels are merged into a syntactic tree as shown by the merging of the nodes (1) into item (2), possibly with repeats to account for loops with edge labels retained in order to preserve and account for loops as well as to recover the original structure whenever needed. The contraction and merging of the nodes is preserved in the contraction expression tree: the complete tree for FIG. 19, using the Contraction Expression Tree rules is produced in the node (7) and is repeated here as:

[e(d)f(a(b))(c)].s[op(u.[m](n))qr].t.[(qr).u.(g)]

Reading back the contraction expression tree is trivial and stores the history in the contractions. For example, the node (g) occurs with edges "u" and "t" in a loop with "qr". By reversing the order from (g), the graph can be recovered. Furthermore, by modifying the formulae in Tarau [10] (which does not account for content but produces a topological structural code) the term can be rewritten by substituting numerals in place of dots and converting the expression tree into a functor, and following the method for encoding a linear symbol sequence, and labeling FIG. 19 (4) as "gmap1" and using the DUNRC algorithm specified earlier. DUNRC=4895928170784910768550999108, and the set of dart labels=[a, b, c, d, e, m, n, o, p, q, r, s, t, u];

4. The Contraction Rule is a rule that is chosen at the start of encoding process and progresses as follows (1) through (7) referring to FIG. 17, therefore, the following output is produced:

[e(d)f(a(b))(c)].s[op(u.[m](n))qr].t.[(qr).u.(g)]
which is encoded as:
DUNRC=4895928170784910768550999108; and, by hashing the symbols into small integers and using the methods of the pairing function in Tarau [10], we have the Discrete Colored Network Code as:
DCNRC=3168559130342272445945010105000

All the history and all prior codes can be deleted since this tree encodes the history. The number of "dot" operations plus one is the number of contraction levels. The deepest element in square brackets is the element with the most number of diverse links (in the example, this is the label "m" having the edges dotted around it as {s,t,u}). The T and G history for FIG. 15, items (1) through (7), for all levels, therefore, is recorded where the first element of the vector is the zeroth contraction level and the last is the n-th contraction level (item(1) and item(7) in FIG. 15 respectively):

T=(0.5823, 0.5981, 0.6773, 0.7659, 0.8115, 0.8921, 0,8921)
G=(0.1001, 0.1501, 0.2533, 0.3738, 0.6738, 0.9738, 0.9738)

A standard Bloom filter is a bit array of m-bits, initialized to 0. There must also be k different hash functions, each of which maps or hashes some set element to one of the m array positions with a uniform random distribution. To add an element, feed it to each of the k-hash functions, which in the simplest case is just a threshold vector, to get k-bit positions and set the bits at all these positions to 1 if and only if the value is greater than the threshold vector.

For two threshold vectors V(T) and V(G), and for the purposes of illustration, V(T)=V(G)=(0.5, 0.5,0.5,0.5,0.5, 0.5,0.5)

The resulting derived Bloom Filters for T and G are:
T=(1, 1, 1, 1, 1, 1, 1)
G=(0, 0, 0, 0, 1, 1, 1)

A single Bloom Filter, F, is the preferred embodiment, as the concatenation of T with G as follows:
F=(1, 1, 1, 1, 1, 1, 1, 0, 0, 0, 0, 1, 1, 1)

FIG. 19, Cognitive Signature (4) data structure for the network is the smallest signature since there is only one property function for T and G resulting in a sequence of 1-vectors for both (which in the preferred embodiment, T and G would be a sequence of k-vectors and m-vectors for their respective k and m matrix and node content property functions) with the symbol store S, Bloom Filter, F, and GUID is:

GUID=gmap1;
T=($(0.5823)_0$, $(0.5981)_1$, $(0.6773)_2$, $(01659)_3$, $(0.8115)_4$, $(0.8921)_5$, $(0.8921)_6$)
G=($(0.1001)_0$, $(0.1501)_1$, $(0.2533)_2$, $(0.3738)_3$, $(0.6738)_4$, $(0.9738)_5$, $(0.9738)_6$)
F=(1, 1, 1, 1, 1, 1, 1, 0, 0, 0, 0, 1, 1, 1)
S=[a, b, c, d, e, f, m, n, o, p, q, r, s, t, u];
DUNRC=4895928170784910768550999108
DCNRC=3168559130342272445945010105000

The Bloom filter may yield a false positive but other test, as will be shown in FIG. 16, will eliminate the false positives. The network vector space consists of a hierarchy of k-vector spaces composed of the vectors of k-property function as well as m-vectors of the m-topology functions of the network. A given member network maps onto one or more of these vector spaces at different levels based on the contraction level (i.e. iteration) number. Depending on the intricacy of the structure being mapped, the network may or may not extend to all levels of the spaces, depending on its size and the specific contraction method chosen. For example, if alpha-zero involutions are edge embedded with labels common in ontologies such as "is-a" for "X is-a Y" then contractions only on the "is-a" labeled edges will provide a different cognitive signature than if the labels are ignored, and all edges are contracted indiscriminately of labeling.

Figure 20:
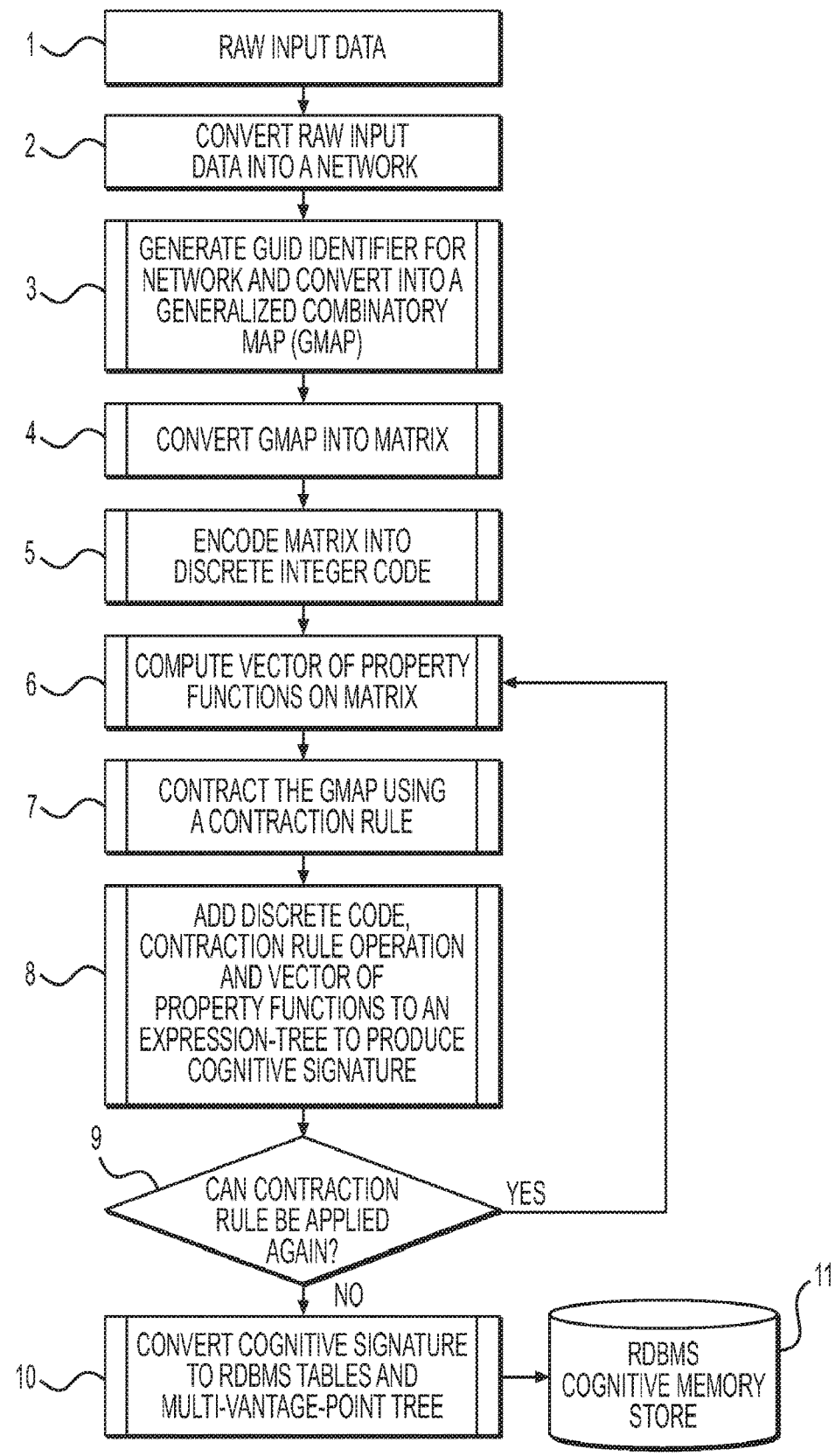
FIG. 20 illustrates a flowchart for Encoding and Storing Networks to an RDBMS.

Now, referring to FIG. 20, the following Algorithm is presented, numbered with main steps (1) through (11) matching the legends in FIG. 20:

Algorithm to Compile and Store a Network:
(1) Raw input data is ingested;
(2) Convert the input network into a Cognitive Signature data structure;
(3) Store the symbolic content of the Network using the following steps on input network:
 1. Read input sample network $G_{in}$
 2. Create a space V by identifying a set of dimensions by pairs of node types and edge types.

3. Create a vector that describes $G_{in}$ based on the identified dimensions by selecting the set of indices to compute (i.e. the size of the matrix properties vector using, for example, literature reference [2]). Add the set of dimensions and to any existing vector space $V_j$ or create if $V_j$ does not exist at level 1, according to the following criteria:
   i. $G_{in}$ is not already available in $V_j$, and
   ii. The overlap between the dimensions identified in $G_{in}$ and in $V_j$ is maximal
4. Order the dimensions in decreasing k-order of their components as well as by the frequency of their occurrence and weighting (if a node weighting function has been selected) in $G_{in}$
5. Partition $G_{in}$ by these different dimensions to create a set of in output networks $G_{out}$ by adding and sewing or un-sewing darts to create the multiplicity of maps.
6. Next, create set of cardinality counts from $G_{in}$. Combining the node types and edge types describing Gin does this. Once a set of dimensions has been derived, project $G_{in}$ along these dimensions by projecting the number of different edge occurrences onto the dimensions. If an edge has a number property (a weight and multiplicity), it is used as a count of the number of occurrences of the edge multiplied by the weight.
7. Repeat from step 1 for level l+1, using each of the partitioned networks $G_{out}$ to $G_{out}$ as input networks, $G_{out}'$ and $G_{out}''$ and $G_{out}'''$ . . . etc.
8. Return the completed initialized database when the steps 1 through 7 are done (no more input)

Member networks are added to (or deleted from) the database. When a new member network is to be added, it must be processed using the same parsing techniques as for any other network. Once the network is parsed, any new feature that is found which is not present in any of the vector spaces is silently ignored for the purposes of retrieval of analogs. The sample chosen in the learning and acquisition phase is important only in terms of context, but unimportant in terms on topological analog. It has to contain at least one occurrence of all topological features that have to be indexed.

(4) The network is given a Global Unique Identity Designation (GUT)) code using an external service or process that may include the generation of strong random numbers. The GLAD must be unique and not clash with any other member network that has already been processed and stored. The network is then converted into a Generalized Combinatorial Map as follows:
   a. For each edge, using integers in sequence, create a pair of darts; or,
   b. For each directed edge, in clockwise order, if the edge is an out-degree of the vertex, assign a dart with a positive sign to the outgoing half, and a negative dart to the edge incoming as the next higher pair of integers to the pair of darts that represent the undirected edge. Each node is described as a rotation (i.e. orbit) of all the darts around it. Therefore, an orbital specification of a map is a sequence of rotations of all nodes in the map in either integer or lexicographic ordering. The output is the GMAP.
(5) The GMAP is converted into a Connectivity Matrix, or equivalently, a Path Graph Matrix, referred to as a the GMAP(0) Matrix;
(6) The Discrete Uncolored Network Representation Code (DUNRC) is computed, and, the Discrete Colored Network Representation Code (DCNRC) is produced.
(7) A vector of property functions is computed on the GMAP(0) Matrix;
(8) Then a Contraction Rule is applied to contract the GMAP(0) to produce a new GMAP(1) that has been contracted by one level of contraction.
(9) The Cognitive Signature is collected and stored for the GMAP(0),
(10) GMAP(1) is tested to see if it can be contracted further and if so, then Steps (5) through (7) are repeated until a fixed point is reached and no further contractions are possible;
(11) The Cognitive Signature vectors are stored in multi-vantage point tree and the GUID of GMAP(0) as well as all discrete codes and Bloom Filters are stored in RDBMS tables, one for each level of contraction. When there is are no more graphs to process or a fixed point is reached with contractions, then the relation database is returned as the result.

For each of the elements in FIG. 20 (11) creates the following indexes:
(a) An index of the database of property function vectors made up of the T and G vectors of the Cognitive Signature using an inverted index that stores the GUID values of networks matching specific T and G pairs: searches the embedding of networks using a multi vantage point tree.
(b) A Cognitive Signature Tree (CST) of all the cognitive signatures generated for each contracted graph in the hierarchy of databases of contraction levels: The CST is used to quickly retrieve a network based either on its GUID, it's Bloom Filter, or its name/label combination, or its property vectors or expression-trees at any contraction level. Networks themselves are stored in one or more data files and the number of networks in a data file is determined by a configurable parameter called "networks per file" (gpf). The CST forms a primary index into these data files, indexing every network contracted into the database. The CST allows quick retrieval of network sets at various abstraction levels.
(c) A Secondary Network Index: This is an index of the Cognitive Signatures to their GUIDS and possible to properties of the signatures themselves
(d) A Structural index based on using the Hash codes (the DCNCR and the DCNCR codes).
(e) A secondary index for the GUIDS to the original network elements stored in the database as a GMAP;

Hence to each network, there is a GUID and to each GUID an associated matrix property vector in a multi-vantage point tree. Using the Bloom Filter, if a property is present in the database, the embedding has the types and the number of occurrences of the candidate in the database. The RDBMS is then searched to look for entries of all values selected by the Bloom Filter present in the database.

The algorithm for storing a GMAP at any given level is as follows:

Algorithm STORE
1. Input GMAP, K, and Level, L. Scan the GMAP M, and identify all K-cells at the same K. Store the GUID and all the K-cell codes (contraction expression codes) in permutation ordering. Let dims(G) be the set of all such codes (i.e. K-cells)thus found.
2. For any K-dimension proj(M,K-Cell-Encoding) be the number of such coded substructures found.

3. Let SL be the vector space in the RDBMS for level L. If GMAP M is the first graph to be inserted at level L, then SL=({ }. { }). Insert GMAP M into SL as follows.
a) Merge dims(M) to dims(SL)
dims(SL)=dims(SL) union with dims(M)
b) Add M to the set of T and G vectors in SL.
vec(T, SL)=vec(T, SL) union with vec(T, M); and,
vec(G, SL)=vec(G, SL) union with vec(G, M).
(Note that for any d in dims(SL) and d not in dims(M), then proj(M,d) is defined to be 0).
4. Stop.

The preferred embodiment for the Cognitive Signature in a traditional RDBMS is the star schema. A star schema comprises of a central table and one or more linked property tables. In the present invention, we alter the star-schema model and we use keys and vectors in a fact table of the form (d1, d2, . . . , dn, v), where d1, d2, . . . , dn are foreign keys (darts) into dimension indexes (i.e. nodes containing vector spaces) and v is a vector or member data element of the vector-spaces database seen as a Multi-Vantage Point Tree.

The basis of our schema begins with an in-memory fact table, however, its structure is different from that of usual fact tables stored in SQL because the dimension links from the dimension tables point into the basis facts and not the other way around! The set of dimension tables be partitioned into equivalence classes representing different layers of the space.

basis(guid, member_network).

Here, guid is a global universal unique designation id assigned to each member network, and member network is a Dart to the member network structure container (a node in the GMAP). The structure of each dimension index is a predicate of the form: dimension_index(proj(vector), network_index).

Here, proj is a projection index value indexing a fixed vector which is the vantage point defining the region which contains points. The network_index is a sorted table of member network guides whose projections on the space in the given dimension are given in a table of vectors. Therefore we have an index to vector table with respect to the vantage points.

Navigation between levels uses (in predicate logic notation) the form: Hierarchy(Levels(NextLevel("integer"), PreviousLevel("integer|void"))) If previous level is void, then we are at the basis level.

Each contraction level contains its own vector space, and each contraction level is modeled as a table in an RDBMS database. The column name of the tables are the projected values of G using a network descriptor, di (d1, d2 . . . dn) of the vector space (the table itself). The last column of each table is the file name that maintains the network structure and description. In the initialization phase, creating a new database name on SQL initializes the cognitive memory. Initialization also creates a set of tables corresponding to a property space for the semantic properties based on the geometric matrix property functions and the set of all vector spaces for topological structure for the vectors created on the topological indices of the matrix representing the network, at each level. Once the dimensions of each of these vector spaces is known, and they are always equal to the maximal k-number of matrix property functions chosen, the corresponding columns are created in these tables by issuing SQL CREATE commands, to have tables sorted by dimensionality. If a new descriptor (i.e. property function) is chosen, it is simply appended to the list of columns.

The network referenced by a node in a schema network may in turn be a schema network itself. This can continue to any levels and in fact, circular and self references are also allowed. A schema can refer to itself as one of its nodes'. When a member network $G_i$ becomes a node in a schema network H, the network properties of $G_i$ become the node properties of whichever node represents $G_i$ in H.

All member networks belong to a schema called the empty vector network. The empty vector comprises only of nodes representing every member network (including itself) in the database. Edges can be added to the empty vector to establish relationships among its elements to represent member networks.

Figure 21:
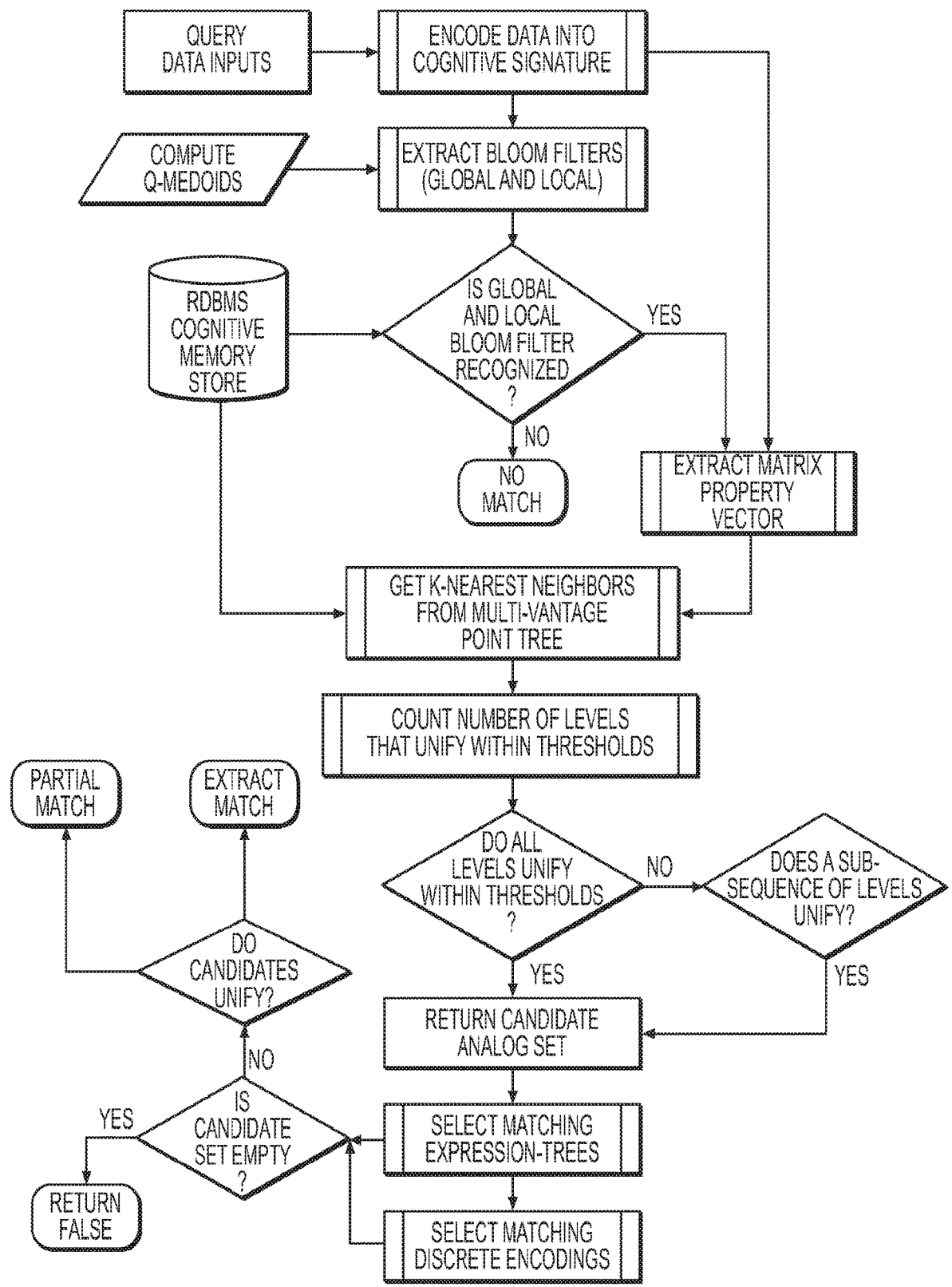
FIG. 21 illustrates a flowchart for Retrieval of Networks from an RDBMS.
Figure 22:
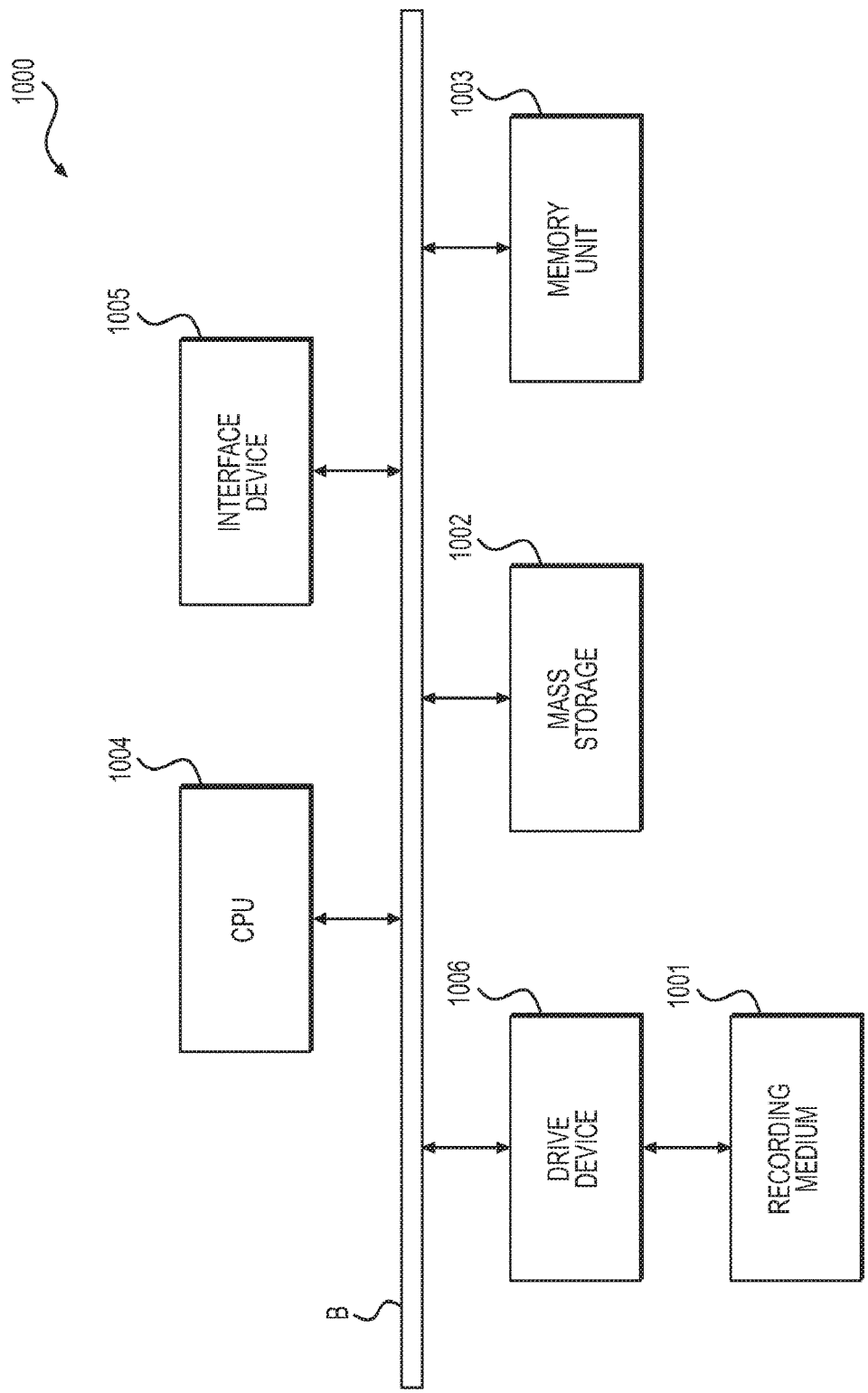
FIG. 22 illustrates a block diagram of a computing device according to one embodiment.

Now referring to FIG. 21 that illustrates the query process in detail that generates partial, analogical and exact matches between the query graph and the graphs in the Cognitive Memory, the following query processing steps are given:

(1) A data query is input and this query is encoded into the Cognitive Signature given by the set of vectors and discrete codes and Bloom Filters for the contraction levels. The query processing starts with query graph and its transformation into Q-medoids, as well as, computation to obtain the implicit distance relationships by using the distance to zone among vertices; In general, query processing involves generating candidate vertex matches once the graph candidate has been returned by the main algorithms. Vertex matching is accelerated by use of the QHash summary in the Bloom filters and standard methods to those skilled in art can be used for strictly verifying the candidate matches to eliminate false positives (2) The method of building the Q-Medoids (using the virtual particle model, the Q-Hashing function and the Network Structure Indices) to build the local Bloom filter indices replaces the methods of ad-hoc user defined thresholds that would in the prior art have enabled the effectiveness of searching for substructures (3) The Cognitive Signature is produced from the input data as show in the FIG. 16, items (1) through (10).

(4) The Bloom Filter is extracted from the user threshold (2) and the data Cognitive Signature (3);

(5) The Bloom Filter is checked first against the stored set in the database using the usual techniques known to those skilled in the art; and, (6) if there is no match then early rejection is provided. However, whether a false positive or a real match is given, the next steps are followed.

(7) The Matrix Property vector which is made up of the T and G vector elements are extracted from the Cognitive Signature for each level; and, (8) The vectors are searched in multi-vantage point tree or other equivalent spatial data storage structure using a k-nearest neighbor algorithm; and, (9) For each of the levels that unify, meaning that there is a k-nearest neighbor match, a count is produced;

(10) if all the levels are matched; or,

(11) If no levels unify then,

(12) No match is returned, else,

(13) Then the candidate set of GUIDS is returned; and,

(14) The matching expression trees are selected within threshold where the expression tree match is given by the Levenstein distance, or any other suitable distance measure between strings; and,

(15) For each nearest expression tree match the ranked nearest discrete encodings, either or preferably both the DUNRC or the DCNRC are matched; and,

(16) If there are no candidates from matches between steps (14) and (15); then,

(17) Return no match; else,

(18) if there is an exact match; then,
(19) Return the exact match; else,
(20) Return the candidates as:
(21) Partial or analogous match (for the user to assess).

Cognitive signatures are stored in a database and compared with respect to the signature of a query input graph. The nearest neighbor match can be made in k(n)log(n) for n member networks in the database time contracted to k-levels. The input complexity is log 2 of the size of the input in practice.

Algorithms for Query Matching in Cognitive Memory:

Each member network returned by a query is given a rank, per FIG. 1 (10). A rank indicates the likelihood of the result being a correct answer. For subnetwork queries, ranking is based on how extensively a member network matched a given query: in other words, that matches occurred at every level within a given threshold of tolerance.

A member network that maps at a higher contextual abstraction level is given a higher ranking than one that matches at a lower abstraction level because higher levels are more generalized and hence will have smaller semantic distances to the subsumed match at more specific lower levels. A lower ranking reflects a longer semantic distance. Similarly, a member network that matches in many vector spaces at any abstraction level is given a higher ranking than one that maps in only few vector spaces.

$$FirstnessRank = \sum_{i}^{N} i \times f_i \times LevelWeight$$

The number of levels is i and fi is the number of matches at the level in which a match exists (i.e. the set of nearest neighbors).

Mapping a query onto regions in one or more vector spaces performs query resolution. Query results are computed by a ranked union of all the points lying in the query region in all vector spaces Query resolution and retrieval hence involves two issues: mapping a query onto regions, and ranking query results. Creating regions is based on a concept called radius of search. Radius of search is a parameter that defines the width of a region along any dimension. This type of search produces approximate matches.

Similarity searches take a network as parameter and returns a set of "topologically similar" networks. Topological distance between networks is the semantic distance and refers to the number of node/edge differences between one network to another with respect to the topological and semantic indices. This kind of query supported is called an Analog Query in the Cognitive Memory.

Subnetwork queries take a query network as input and returns all networks that are likely to have the query network as one of its subnetwork. All properties for a given guid at any given level are treated as a vector depicting the position of the network in a space at that level. When a query network is similarly projected, query results would be based on distances between the query network vector and the member network vector.

In order to mine for common subnetworks in a database of networks, the search premise is that all networks in the database are isomorphic, and progressively starts pruning local networks locally connected that refute such an assertion. The process then converges to the maximal common subnetworks among the networks in the local. Therefore, search does not "see" the global view at any given level, and hence, indexing is a function of repeating the process at multiple levels (iterative deepening of search):

Algorithm to Search for Common Sub-Networks:

Given a query network Q and a Cognitive Memory database, a similarity search proceeds as follows.

1. Start from level l=0 as the first level after the root of the CST tree
2. Let WS be the set of all guids present in the database S
3. Let Q1 be the set of all contractions and their corresponding number of occurrences in the query network (i.e. the vector of query network) at level l
4. Let L1 be the set of all contraction vectors in the CST tree at level l
5. Compare Q1 with L1 and obtain the set of all guids WL that are "close enough" to the query vector, based on a window parameter, R radius, for S.
6. Compute R1=W Sn WL as the set of query results at level l
7. Since query results at level l+1 has to be contained in the query results at level l, remove all guids from WS that are not in R1. That is, WS=WS intersected with R1.
8. If any division in L1 contains no guids from the new W1, mark the corresponding node in the CST tree as not Used. The entire sub-tree under this node can be ignored when comparing at the next level
9. Set l=l+1 and return to step 2 until the desired number of refinements are done The "close enough" function is computed by considering a sphere of radius S around the query network vector at each level and adding all vectors that lie within this radius. For substructure queries, the "close enough" function is replaced by the function, which returns the set of all vectors that lie above the query vector.

Topological queries can be performed by providing a network ref (GUID) as input parameter to functions like analog( ), contains( ) and mcg( ). Here mcg stands for "maximal common subnetwork" between the query network and the network ref in the third parameter. All the above topological query constructs come in two forms:

1. Single-step topological query, where topological searches are performed for one level above the previous search and use the DUNCR to prune false matches, if any, and
2. Multi-step topological query, where topological searches are performed for a pre-specified number of levels using the DUNCR for pruning.

Thus, the foregoing discussion discloses and describes merely exemplary embodiments of the present invention. As will be understood by those skilled in the art, the present invention may be embodied in other specific forms without departing from the spirit or essential characteristics thereof in coupling and combining a contraction rule with a hash code and/or a function on the network for property or topology. Accordingly, the disclosure of the present inventions intended to be illustrative, but not lit citing of the scope of the invention, as well as other claims. The disclosure, including any readily discernible variants of the teachings herein, defines, in part, the scope of the foregoing claim terminology such that no inventive subject matter is dedicated to the public.

The present embodiments may include and implement quantum computing features or aspects and may be implemented physically on a quantum computer or virtually via emulation of a quantum computer or computing aspects.

Supercomputers or computing or any other similar technique can be used to implement the features described herein.

The various features discussed above may be implemented by a computing device such as a computer system (or programmable logic). The circuitry may be particularly designed or programmed to implement the above described functions and features which improve the processing of the circuitry and allow data to be processed in ways not possible by a human or even a general purpose computer lacking the features of the present embodiments. Features of the invention can be implemented using some form of computer processor. As one of ordinary skill in the art would recognize, the computer processor can be implemented as discrete logic gates, as an Application Specific integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

In addition, the invention can be implemented using a computer based system 1000. The computer 1000 includes a bus B or other communication mechanism for communicating information, and a processor/CPU 1004 coupled with the bus B for processing the information. The computer 1000 also includes a main memory/memory unit 1003, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 1004. In addition, the memory unit 1003 may be used for storing temporary variables or other intermediate information during the execution of instructions by the CPU 1004. The computer 1000 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 1004.

The computer 1000 may also include a disk controller coupled to the bus B to control one or more storage devices for storing information and instructions, such as mass storage 1002, and drive device 1006 (e.g., floppy disk drive, read-only compact disc drive, read/write compact disc drive, compact disc jukebox, tape drive, and removable magneto-optical drive). The storage devices may be added to the computer 1000 using an appropriate device interface (e.g., small computer system interface (SCSI), integrated device electronics (IDE), enhanced-IDE (E-IDE), direct memory access (DMA), or ultra-DMA).

The computer 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 1000 may also include a display controller coupled to the bus B to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer 1000 performs at least a portion of the processing steps of the invention in response to the CPU 1004 executing one or more sequences of one or more instructions contained in a memory, such as the memory unit 1003. Such instructions may be read into the memory unit from another computer readable medium, such as the mass storage 1002 or a removable media 1001. One or more processors in a multi-processing arrangement may also be employed to execute the sequences of instructions contained in memory unit 1003. In alternative embodiments, hard-wired circuitry may be used in place of or in combination with software instructions. Thus, embodiments are not limited to any specific combination of hardware circuitry and software.

As stated above, the computer 1000 includes at least one computer readable medium 1001 or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the main processing unit, for driving a device or devices for implementing the invention, and for enabling the main processing unit to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code elements on the medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 1004 for execution. A computer readable medium may take many forms, including but not limited to, non-volatile media, and volatile media. Non-volatile media includes, for example, optical, magnetic disks, and magneto-optical disks, such as the mass storage 1002 or the removable media 1001. Volatile media includes dynamic memory, such as the memory unit 1003.

Various forms of computer readable media may be involved in carrying out one or more sequences of one or more instructions to the CPU 1004 for execution. For example, the instructions may initially be carried on a magnetic disk of a remote computer. An input coupled to the bus B can receive the data and place the data on the bus B. The bus B carries the data to the memory unit 1003, from which the CPU 1004 retrieves and executes the instructions. The instructions received by the memory unit 1003 may optionally be stored on mass storage 1002 either before or after execution by the CPU 1004.

The computer 1000 also includes a communication interface 1005 coupled to the bus B. The communication interface 1004 provides a two-way data communication coupling to a network that is connected to, for example, a local area network (LAN), or to another communications network such as the Internet. For example, the communication interface 1005 may be a network interface card to attach to any packet switched LAN. As another example, the communication interface 1005 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1005 sends and receives electrical, electromagnetic or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to, and the computer 1000 may be, a mobile device such as a personal digital assistant (PDA) laptop computer, or cellular telephone.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions. Furthermore any embodiment can be combined with any other embodiment as needed.

While aspects of the present disclosure have been described in conjunction with the specific embodiments thereof that are proposed as examples, alternatives, modifications, and variations to the examples may be made. Furthermore, it should be noted that, as used in the specification and the appended claims, the singular forms "a," "an," and "the" include plural referents unless the context clearly dictates otherwise.

REFERENCES

1. Liu, Y. P., 1999, Enumerative Theory of Maps. Kluwer, Boston
2. Roberto Todeschini and Viviana Consonni, *Molecular Descriptors for Chemoinformatics* (2 volumes), Wiley-VCH, 2009.
3. Levinson, R. A., *Self-organising retrieval system for graphs* Proceedings of the AAAI (1984), 203-206.
4. D. Cook and L. Holder (editors), *Mining Graph Data*, John Wiley and Sons, 2006.
5. E. G. M. Petrakis, C. Faloutsos. Similarity Searching in Medical Image Databases. IEEE Transactions on Knowledge and Data Engineering, Vol. 9, No. 3,1997.
6. Gareth, A. J., Singerman, D., 1978. Theory of maps on orientable surfaces. Proceedings of the London Mathematical Society 3 (37), 273-307.
7. Kropatsch, W. G., December 1995. Building Irregular Pyramids by Dual Graph Contraction. IEE-Proc. Vision, Image and Signal Processing Vol. 142 (No. 6), pp. 366-374.
8. J. Ian Munro and Venkatesh Raman. Succinct representation of balanced parentheses, static trees and planar graphs. In IEEE Symposium on Foundations of Computer Science, pages 118-126, 1997.
9. Guy Joseph Jacobson. Space-efficient static trees and graphs. In 30th Annual Symposium on Foundations of Computer Science, pages 549-554,1989.
10. Paul Tarau. 2009. An embedded declarative data transformation language. In *Proceedings of the 11th ACM SIGPLAN conference on Principles and practice of declarative programming* (PPDP '09). ACM, New York, N.Y., USA, 171-182. DOI=10.1145/1599410.1599432 http://doi.acm.org/10.1145/1599410.1599432
11. Matthew J. Rattigan, Marc Maier, and David Jensen. 2006. Using structure indices for efficient approximation of network properties. In Proceedings of the 12th ACM SIGKDD international conference on Knowledge discovery and data mining (KDD '06). ACM, New York, N.Y., USA, 357-366.
12. Matthew J. Rattigan, Marc Maier, and David Jensen. 2007. Graph clustering with network structure indices. In Proceedings of the 24th international conference on Machine learning (ICML '07), Zoubin Ghahramani (Ed.). ACM, New York, N.Y., USA, 783-790.
13. Gudkov and S. Nussinov, "Graph equivalence and characterization via a continuous evolution of a physical analog," cond-mat/0209112
14. V. Gudkov, J. E. Johnson and S. Nussinov, arXiv: cond-mat/0209111 (2002).
15. Vladimir Gudkov, Shmuel Nussinov, arXiv:cond-mat/0209112v2 (2007)
16. Gudkov, V., Montealegre, V., Nussinov, S., and Nussinov, Z. (2008). Community detection in complex networks by dynamical simplex evolution. Physical Review E, 78(1), 016113-1-016113-7.
17. John King Gamble, Mark Friesen, Dong Zhou, Robert Joynt, and S. N. Coppersmith, Two-particle quantum walks applied to the graph isomorphism problem, PHYSICAL REVIEW A, 81, 052313 (2010)
18. T. Rudolph, "Constructing physically intuitive graph invariants," quant-ph/0206068

19. V. V. Sreedhar, The classical and quantum mechanics of a particle on a knot, Annals of Physics, Volume 359, August 2015, Pages 20-30.
20. U.S. Pat. No. 8,566,321: Conceptual Relativity
21. U.S. Pat. No. 9,158,847: Cognitive Memory

The invention claimed is:

1. A non-transitory computer readable medium including therein a data structure, the data structure comprising a Cognitive signature including:
   a field to identify a contraction level of a plurality of contraction levels of a network;
   an entry for a Globally Unique Identity Designation (GUID) code, the GUID code uniquely identifying the network;
   a field to identify a function value computed on the contraction level of the network;
   a partition index corresponding to a sub-graph of the network, the network being partitioned into a plurality of sub-graphs based on Q-Medoids in equilibrium with force potentials applied among nodes of the network;
   a distance estimating vector between each sub-graph of the network with other sub-graphs of the network;
   a hash associated with each sub-graph of the network, the hash being generated using a virtual particle interactions among nodes of the each sub-graph, the virtual particle interactions being affected by a shell boundary;
   a field to include a local Bloom filter corresponding to a range of radii of a Q-Medoid of a sub-graph,
   wherein the virtual particle interactions among the nodes of the each sub-graph are determined by:
      selecting a Q-Medoid at random,
      setting a shape of the shell boundary and initializing parameters of the hash of the Q-Medoid,
      iteratively updating an angular phase function for the virtual particle interactions until all nodes within a range of radii of the selected Q-Medoid have been processed, and
      generating the hash that includes a concatenation of double applications of the angular phase function for the virtual particle interactions.

2. The non-transitory computer readable medium of claim 1, wherein the Cognitive signature further comprises
   a set T of an ordered list of first vectors, each vector corresponding to the contraction level of the network;
   a set G of a list of second vectors, each second vector corresponding to the contraction level of the network;
   a field F to include a global Bloom filter, the global Bloom filter being computed based on the set T and a corresponding first threshold vector, and the set G and a corresponding second threshold vector;
   a field for a discrete unlabeled network representation code (DCNRC);
   a field for a discrete colored network representation (DCNRC); and
   a field for a pointer to a next Cognitive signature.

3. The non-transitory computer readable medium of claim 2, wherein the Cognitive signature further comprises a field for a contraction tree operator expressions, the contraction tree operator indicating whether the network is contracted based on a contraction rule.

4. The non-transitory computer readable medium of claim 1, wherein the Cognitive signature is produced each time the network is contracted, and the local Bloom filters is computed once.

5. The non-transitory computer readable medium of claim 1, wherein the hash is based on a random walk of virtual particles among the nodes of the each sub-graph.

6. The non-transitory computer readable medium of claim 1, wherein a shape of the shell boundary corresponds to a quantum probability density functional.

7. The non-transitory computer readable medium of claim 1, wherein the local Bloom filter is computed based on a plurality of hashes associated with the Q-Medoid of the sub-graph, wherein each hash of the plurality of hashes is set by a respective unique initial condition.

8. The non-transitory computer readable medium of claim 1, wherein the DUNRC is computed based on a connectivity matrix of the network, the connectivity matrix being computed based on the distance estimating vector of each sub-graph, and the hash associated with each sub-graphs of the network.

9. The non-transitory computer readable medium of claim 1, wherein the partition index further includes that the plurality of sub-graphs is partitioned based on the nodes of the network being in equilibrium with the force potentials, wherein between nodes that share an edge experience a respective force potential is attractive, and between nodes that do not share an edge a respective force potential is repulsive.

10. The non-transitory computer readable medium of claim 9, wherein a total amount of repulsive force potentials of the network equals a total amount of attractive force potentials of the network.

11. The non-transitory computer readable medium of claim 1, wherein the partition index further includes that the plurality of sub-graphs are clustered in zones according to a networks structure index based on a distance to zone measure among respective nodes in the zones.

12. A method of encoding a network into a data structure, which is a Cognitive signature, the method being executed by a computer including circuitry, the method comprising:
   inputting a network;
   identifying a contraction level of a plurality of contraction levels of the network;
   generating a unique Globally Unique Identity Designation (GUID) code that identifies the network;
   identifying a function value computed on the contraction level of the network;
   partitioning the network into a plurality of sub-graphs based on Q-Medoids in equilibrium with force potentials applied among nodes of the network;
   estimating distance vectors between each sub-graph of the network with other sub-graphs of the network;
   computing a hash that is associated with each sub-graph of the network; and
   computing a local Bloom filter corresponding to the second parameter of each sub-graph, the local Bloom filter being computed based on the estimated distance vectors and the hash.

13. The method of claim 12, wherein the hash is generated using virtual particle interactions among nodes of the each sub-graph, the virtual particle interactions being affected by a shell boundary.

14. The method of claim 12, further comprising:
   generating an ordered list of first vectors in a field T, each first vector corresponding to the contraction level of the network;
   generating a list of second vectors in a field G, each second vector corresponding to the contraction level of the network;
   calculating a global Bloom filter, the global Bloom filter being computed based on the set T and a corresponding first threshold vector, and the set G and a corresponding second threshold vector;

generating a discrete unlabeled network representation code (DUNRC) and a discrete colored network representation (DCNRC); and encoding the network into the data structure based on the local Bloom filter, the global Bloom filter, the DUNRC, and the DCNRC.

15. The method of claim 14, further comprising:

producing the Cognitive signature each time the network is contracted, and computing the local Bloom filters and the distance estimating vector only once.

16. The method of claim 12, wherein the partitioning of the network into the plurality of sub-graphs further includes that the plurality of sub-graphs is partitioned based on the nodes of the network being in equilibrium with the force potentials, wherein between nodes that share an edge experience a respective force potential is attractive, and between nodes that do not share an edge a respective force potential is repulsive.

17. The method of claim 16, wherein the partitioning of the network into the plurality of sub-graphs further includes that a total amount of repulsive force potentials of the network equals a total amount of attractive force potentials of the network.

18. The method of claim 12, wherein the partitioning of the network into the plurality of sub-graphs further includes that the plurality of sub-graphs are clustered in zones according to a networks structure index based on a distance to zone measure among respective nodes in the zones.

19. The method of claim 12, wherein computing the hash that is associated with the each sub-graph of the network includes:

computing the hash that is associated with the each sub-graph of the network and being associated with the estimated distance vectors, the hash being generated using virtual particle interactions among nodes of the each sub-graph, the virtual particle interactions being affected by a shell boundary.

20. The method of claim 19, wherein the computing of the hash is based on a random walk of virtual particles among the nodes of the each sub-graph.

* * * * *

UNITED STATES PATENT AND TRADEMARK OFFICE
CERTIFICATE OF CORRECTION

PATENT NO. : 10,747,740 B2  
APPLICATION NO. : 15/568293  
DATED : August 18, 2020  
INVENTOR(S) : Arun Majumdar Page 1 of 1

It is certified that error appears in the above-identified patent and that said Letters Patent is hereby corrected as shown below:

On the Title Page

Item (73), the Assignee's city is incorrect. Item (73) should read:  
--(73) Assignee: KYNDI, INC., San Mateo, CA (US)--

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*